US008151361B2

(12) United States Patent
Morimoto

(10) Patent No.: US 8,151,361 B2
(45) Date of Patent: Apr. 3, 2012

(54) IMAGE-PROCESSING SYSTEM ENABLING USER TO USE A PLURALITY OF COMMUNICABLY CONNECTED IMAGE-PROCESSING APPARATUSES, IMAGE-PROCESSING APPARATUS, FUNCTION EXECUTION AUTHORIZING METHOD, AND FUNCTION EXECUTION AUTHORIZING PROGRAM EMBODIED IN COMPUTER READABLE MEDIUM

(75) Inventor: Tsuyoshi Morimoto, Itami (JP)

(73) Assignee: Konica Minolta Business Tehnologies, Inc., Tokyo (JP)

( * ) Notice: Subject to any disclaimer, the term of this patent is extended or adjusted under 35 U.S.C. 154(b) by 1015 days.

(21) Appl. No.: 11/640,957

(22) Filed: Dec. 19, 2006

(65) Prior Publication Data

US 2008/0016582 A1 Jan. 17, 2008

(30) Foreign Application Priority Data

Jul. 14, 2006 (JP) ................................. 2006-194546

(51) Int. Cl.
*G06F 7/04* (2006.01)
(52) U.S. Cl. ............................ 726/28; 713/176; 358/382
(58) Field of Classification Search .................... 726/28; 235/380, 382, 375
See application file for complete search history.

(56) References Cited

U.S. PATENT DOCUMENTS

| 5,999,766 A * | 12/1999 | Hisatomi et al. ................ 399/80 |
| 2004/0162854 A1* | 8/2004 | Maruta et al. ............... 707/104.1 |
| 2006/0015734 A1* | 1/2006 | Atobe ........................... 713/176 |

FOREIGN PATENT DOCUMENTS

JP 2002-63008 2/2002

\* cited by examiner

*Primary Examiner* — Vivek Srivastava
*Assistant Examiner* — Samuel Ambaye
(74) *Attorney, Agent, or Firm* — Morrison & Foerster LLP

(57) ABSTRACT

In order to facilitate the setting of functions executable in each of a plurality of image-processing apparatuses that are communicably connected to one another, each of the MFPs, which are communicably connected to one another, stores registered-user information including at least user identification information in each HDD. When an operated terminal among the plurality of MFPs receives user identification information, the operated terminal judges whether its HDD stores registered-user information including the received user identification information. When judging in the affirmative, the operated terminal permits execution of the functions possessed by the operated terminal. When judging in the negative, the operated terminal acquires, from the MFP (home terminal) that stores registered-user information including the received user identification information, the function information of the home terminal, and permits execution of the functions, among the functions defined in the function information of the home terminal, that are also possessed by the operated terminal.

19 Claims, 15 Drawing Sheets

FIG. 4A

REGISTERED-USER INFORMATION OF MFP 100

| NUMBER | USER IDENTIFICATION INFORMATION | PERSONAL INFORMATION |
|---|---|---|
| 1 | DAVID | AUTHENTICATION INFORMATION A |

FIG. 4B

REGISTERED-USER INFORMATION OF MFP 100A

| NUMBER | USER IDENTIFICATION INFORMATION | PERSONAL INFORMATION |
|---|---|---|
| 2 | JULIE | AUTHENTICATION INFORMATION B |

FIG. 4C

REGISTERED-USER INFORMATION OF MFP 100B

| NUMBER | USER IDENTIFICATION INFORMATION | PERSONAL INFORMATION |
|---|---|---|
| 3 | TED | AUTHENTICATION INFORMATION C |

FIG. 4D

REGISTERED-USER INFORMATION OF MFP 100C

| NUMBER | USER IDENTIFICATION INFORMATION | PERSONAL INFORMATION |
|---|---|---|
| 4 | MICHAEL | AUTHENTICATION INFORMATION D |
| 5 | SUZAN | AUTHENTICATION INFORMATION E |

FIG. 7A

FUNCTION INFORMATION OF MFP 100A

| FUNCTION: | MONOCHROME PRINTING |
| --- | --- |
| | TRANSMISSION AND RECEPTION BY FACSIMILE |
| PAPER SIZE: | A4 |
| | B4 |
| | A3 |
| LAYOUT: | 1in1 |
| | 2in1 |
| | 4in1 |
| OTHER CONDITIONS: | ONE-SIDED PRINTING |
| | DUPLEX PRINTING |
| | STAPLED |

FIG. 7B

FUNCTION INFORMATION OF MFP 100

| FUNCTION: | MONOCHROME PRINTING |
| --- | --- |
| | MONOCHROME COPYING |
| | MONOCHROME PC SCANNING |
| | COLOR PRINTING |
| | COLOR COPYING |
| | COLOR PC SCANNING |
| | TRANSMISSION AND RECEPTION BY FACSIMILE |
| PAPER SIZE: | A4 |
| | A3 |
| LAYOUT: | 1in1 |
| | 2in1 |
| | 4in1 |
| OTHER CONDITIONS: | ONE-SIDED PRINTING |
| | DUPLEX PRINTING |
| | PUNCHED |

FIG. 8

FUNCTIONS PERMITTED TO THE USER "JULIE"

| FUNCTION: | MONOCHROME PRINTING |
| --- | --- |
| | TRANSMISSION AND RECEPTION BY FACSIMILE |
| PAPER SIZE: | A4 |
| | A3 |
| LAYOUT: | 1in1 |
| | 2in1 |
| | 4in1 |
| OTHER CONDITIONS: | ONE-SIDED PRINTING |
| | DUPLEX PRINTING |

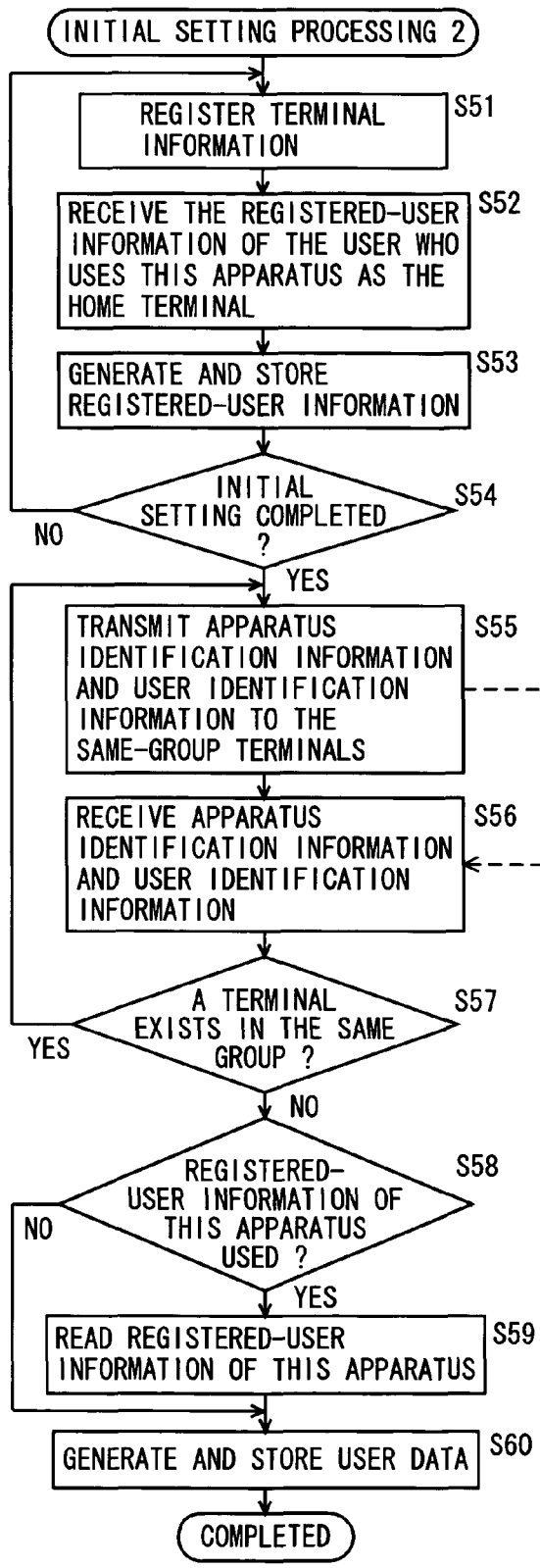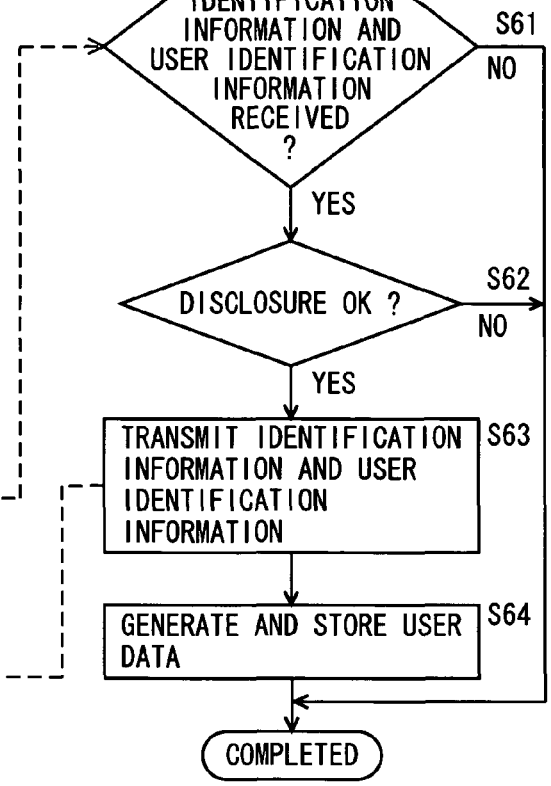

FIG. 10A

REGISTERED-USER INFORMATION OF MFP 100

| NUMBER | USER IDENTIFICATION INFORMATION | PERSONAL INFORMATION | FUNCTION INFORMATION | DISCLOSABILITY INFORMATION |
|---|---|---|---|---|
| 1 | DAVID | AUTHENTICATION INFORMATION A | FUNCTION INFORMATION A | OK |

FIG. 10B

REGISTERED-USER INFORMATION OF MFP 100A

| NUMBER | USER IDENTIFICATION INFORMATION | PERSONAL INFORMATION | FUNCTION INFORMATION | DISCLOSABILITY INFORMATION |
|---|---|---|---|---|
| 2 | JULIE | AUTHENTICATION INFORMATION B | FUNCTION INFORMATION B | OK |

FIG. 10C

REGISTERED-USER INFORMATION OF MFP 100B

| NUMBER | USER IDENTIFICATION INFORMATION | PERSONAL INFORMATION | FUNCTION INFORMATION | DISCLOSABILITY INFORMATION |
|---|---|---|---|---|
| 3 | TED | AUTHENTICATION INFORMATION C | FUNCTION INFORMATION C | OK |

FIG. 10D

REGISTERED-USER INFORMATION OF MFP 100C

| NUMBER | USER IDENTIFICATION INFORMATION | PERSONAL INFORMATION | FUNCTION INFORMATION | DISCLOSABILITY INFORMATION |
|---|---|---|---|---|
| 4 | MICHAEL | AUTHENTICATION INFORMATION D | FUNCTION INFORMATION D | OK |
| 5 | SUZAN | AUTHENTICATION INFORMATION E | FUNCTION INFORMATION E | NG |

F I G. 1 1

USER DATA

| NUMBER | USER IDENTIFICATION INFORMATION | HOME TERMINAL |
|---|---|---|
| 1 | DAVID | IP ADDRESS OF MFP 100 |
| 2 | JULIE | IP ADDRESS OF MFP 100A |
| 3 | TED | IP ADDRESS OF MFP 100B |
| 4 | MICHAEL | IP ADDRESS OF MFP 100C |

FIG. 14A

FUNCTION INFORMATION OF
THE USER "JULIE"

| USER NAME: JULIE<br>PASSWORD: abcde | |
|---|---|
| FUNCTION: | MONOCHROME PRINTING |
| | TRANSMISSION AND RECEPTION BY FACSIMILE (NOT PERMITTED) |
| PAPER SIZE: | A4 |
| | B4 (NOT PERMITTED) |
| | A3 (NOT PERMITTED) |
| LAYOUT: | 1in1 (NOT PERMITTED) |
| | 2in1 |
| | 4in1 |
| OTHER CONDITIONS: | ONE-SIDED PRINTING (NOT PERMITTED) |
| | DUPLEX PRINTING |
| | STAPLED (NOT PERMITTED) |

FIG. 14B

FUNCTION INFORMATION OF MFP 100

| | MONOCHROME PRINTING |
|---|---|
| FUNCTION: | MONOCHROME COPYING |
| | MONOCHROME PC SCANNING |
| | COLOR PRINTING |
| | COLOR COPYING |
| | COLOR PC SCANNING |
| | TRANSMISSION AND RECEPTION BY FACSIMILE |
| PAPER SIZE: | A4 |
| | A3 |
| LAYOUT: | 1in1 |
| | 2in1 |
| | 4in1 |
| OTHER CONDITIONS: | ONE-SIDED PRINTING |
| | DUPLEX PRINTING |
| | PUNCHED |

FIG. 15

FUNCTIONS PERMITTED TO THE USER "JULIE"

| FUNCTION: | MONOCHROME PRINTING |
|---|---|
| PAPER SIZE: | A4 |
| LAYOUT: | 2in1 |
| | 4in1 |
| OTHER CONDITIONS: | DUPLEX PRINTING |

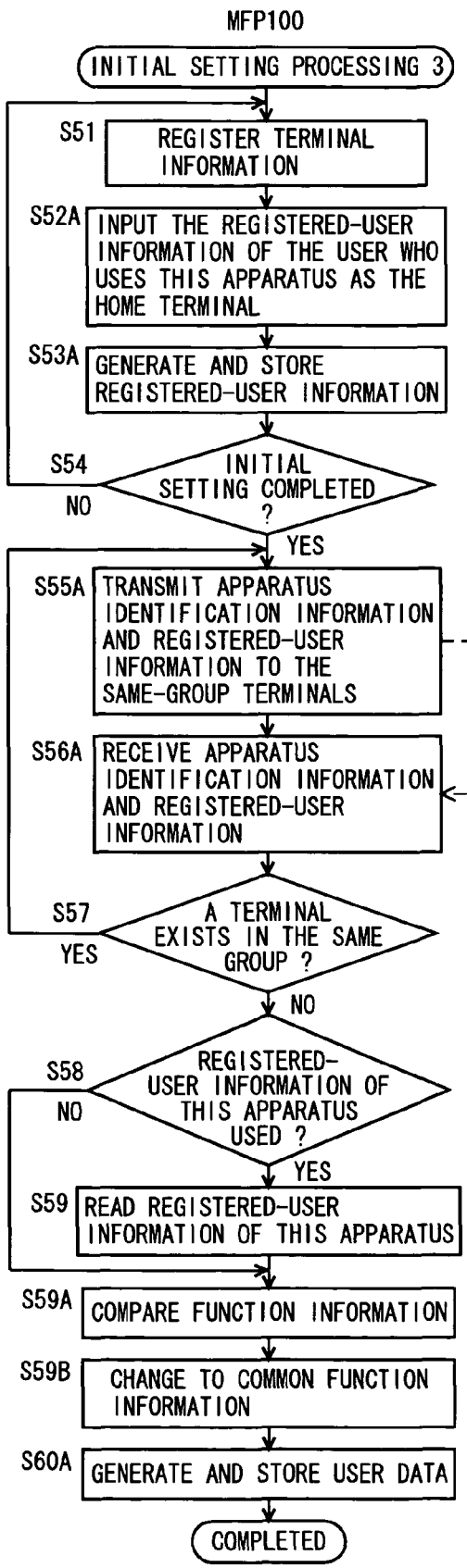
FIG. 16A / FIG. 16B

F I G. 1 7

USER DATA

| NUMBER | USER IDENTIFICATION INFORMATION | PERSONAL INFORMATION | FUNCTION INFORMATION | HOME TERMINAL |
|---|---|---|---|---|
| 1 | DAVID | AUTHENTICATION INFORMATION A | FUNCTION INFORMATION A | IP ADDRESS OF MFP 100 |
| 2 | JULIE | AUTHENTICATION INFORMATION B | FUNCTION INFORMATION B | IP ADDRESS OF MFP 100A |
| 3 | TED | AUTHENTICATION INFORMATION C | FUNCTION INFORMATION C | IP ADDRESS OF MFP 100B |
| 4 | MICHAEL | AUTHENTICATION INFORMATION D | FUNCTION INFORMATION D | IP ADDRESS OF MFP 100C |

IMAGE-PROCESSING SYSTEM ENABLING USER TO USE A PLURALITY OF COMMUNICABLY CONNECTED IMAGE-PROCESSING APPARATUSES, IMAGE-PROCESSING APPARATUS, FUNCTION EXECUTION AUTHORIZING METHOD, AND FUNCTION EXECUTION AUTHORIZING PROGRAM EMBODIED IN COMPUTER READABLE MEDIUM

This application is based on Japanese Patent Application No. 2006-194546 filed with Japan Patent Office on Jul. 14, 2006, the entire content of which is hereby incorporated by reference.

BACKGROUND OF THE INVENTION

1. Field of the Invention

The present invention relates to an image-processing system, an image-processing apparatus, a function execution authorizing method, and a function execution authorizing program embodied in a computer readable medium. More specifically, the invention relates to an image-processing system enabling a user to use a plurality of communicably connected image-processing apparatuses, an image-processing apparatus, a function execution authorizing method executed in the image-processing apparatus, and a function execution authorizing program that is embodied in a computer readable medium and executed in the image-processing apparatus.

2. Description of the Related Art

In recent years, it has become common to connect image-processing apparatuses such as scanners, printers, and facsimiles to networks. Regarding this form of use, Japanese Patent Application Publication No. 2002-63008 describes a printer-user limiting system to limit users who are permitted to use each of a plurality of image-processing apparatuses. In this printer-user limiting system, a terminal apparatus and a printer are connected to a network, and the printer executes a print processing in accordance with a print demand from the terminal apparatus. In this event, the printer-user limiting system controls printability/unprintability in accordance with where the print demand is from. To the network, a server is connected having a user-control-data storing means to register users who are permitted to use the printer as a user control list. The printer has an access control function to store the addresses of terminal apparatuses that are permitted access in, as an access permission list, an access-permission-data storing means, and to control giving the print-demand making terminal apparatus permission/nonpermission of access in accordance with whether the address of the terminal apparatus is registered in the access permission list. Before making a print demand to the printer using the terminal apparatus, the user makes an authentication demand designating the printer to the server. In response to the authentication demand, the server, when the user is registered as a permitted user in the user control list, demands the printer to additionally register the address of the terminal apparatus used by the user in the access permission list, and permits the user to use the printer via the terminal apparatus.

However, the conventional printer-user limiting system requires providing a server and storing a user control list in the server. Having to provide a server makes the system structure complicated. In addition, when a new terminal apparatus or a new image-processing apparatus is connected to the network, there is the trouble of storing in the newly connected apparatus the network address of the server required for access thereto. This poses the problem of inability to flexibly deal with system amendment.

SUMMARY OF THE INVENTION

The present invention has been accomplished in order to solve the above problems. It is an object of the present invention to provide an image-processing system that facilitates setting of functions executable in each of a plurality of communicably connected image-processing apparatuses.

It is another object of the present invention to provide an image-processing apparatus that facilitates setting of executable functions that are permitted on a user basis.

It is another object of the present invention to provide a function execution authorizing method that facilitates setting of executable functions that are permitted on a user basis.

It is another object of the present invention to provide a function execution authorizing program that is embodied in a computer readable medium and that facilitates setting of executable functions that are permitted on a user basis.

According to one aspect of the present invention, there is provided an image-processing system including a plurality of communicably connected image-processing apparatuses, each of the plurality of image-processing apparatuses comprising: a storing portion to store registered-user information including at least user identification information for identifying a user; a user-identification-information receiving portion to receive input of user identification information; a judging portion to judge whether registered-user information including the received user identification information is stored in the storing portion; a first permitting portion to, when the judging portion judges that registered-user information including the received user identification information is stored in the storing portion, permit execution of at least one function possessed by the first permitting portion's own image-processing apparatus; a function information acquiring portion to, when the judging portion judges that registered-user information including the received user identification information is not stored in the storing portion, acquire function information defining at least one function possessed by another image-processing apparatus among the plurality of image-processing apparatuses, the another image-processing apparatus storing registered-user information including the received user identification information; and a second permitting portion to permit execution of functions among the number of functions defined in the function information, the permitted functions being also possessed by the second permitting portion's own image-processing apparatus.

According to this aspect, by storing user identification information in either one of a plurality of communicably connected image-processing apparatuses, an image-processing apparatus that does not store the user identification information can be used to execute functions that are within the range of the functions possessed by the image-processing apparatus that stores the user identification information. Thus, by the simple operation of storing user identification information in either one of a plurality of communicably connected image-processing apparatuses, another image-processing apparatus can be used to execute functions within the range of the functions possessed by the one image-processing apparatus. This enables it to provide an image-processing system that facilitates setting of functions executable in each of a plurality of communicably connected image-processing apparatuses.

According to another aspect of the present invention, there is provided an image-processing system including a plurality of communicably connected image-processing apparatuses, each of the plurality of image-processing apparatuses comprising: a storing portion to store registered-user information including user identification information for identifying a user and function information defining functions among functions possessed by each image-processing apparatus, the defined functions being permitted to be executed by the user identified by the user identification information; a first registered-user-information generating portion to receive input of user identification information and function information and to generate new registered-user information including the received user identification information and the received function information; a registering portion to store the new registered-user information in the storing portion; a user-identification-information receiving portion to receive input of the user identification information; and a permitting portion to permit execution of functions defined in the function information corresponding to the received user identification information on condition that registered-user information including the user identification information received by the user-identification-information receiving portion is stored in the storing portion, wherein the registering portion includes: a register-demand transmitting portion to, when storing the new registered-user information in the storing portion, transmit a register demand to all the other image-processing apparatuses, the register demand including the user identification information and the function information; and a second registered-user-information generating portion to generate, in response to receiving the register demand including the user identification information and the function information from either one of the plurality of image-processing apparatuses, new registered-user information including the received user identification information and new function information defining functions among functions defined in the received function information, the defined functions being also possessed by the second registered-user-information generating portion's own image-processing apparatus.

According to this aspect, by the simple operation of storing user identification information in either one of a plurality of communicably connected image-processing apparatuses, another image-processing apparatus can be used execute functions within the range of the functions possessed by the one image-processing apparatus. This enables it to provide an image-processing system that facilitates setting of functions executable in each of a plurality of communicably connected image-processing apparatuses.

According to another aspect of the present invention, there is provided an image-processing apparatus mutually communicable with another image-processing apparatus, the image-processing apparatus comprising: a storing portion to store registered-user information including at least user identification information for identifying a user; a user-identification-information receiving portion to receive input of the user identification information; a judging portion to judge whether the registered-user information including the received user identification information is stored in the storing portion; a first permitting portion to, when the judging portion judges that registered-user information including the received user identification information is stored in the storing portion, permit execution of at least one function possessed by the first permitting portion's own image-processing apparatus; a function information acquiring portion to, when the judging portion judges that registered-user information including the received user identification information is not stored in the storing portion, acquire function information defining at least one function possessed by another image-processing apparatus storing the registered-user information including the received user identification information; and a second permitting portion to permit execution of functions among the functions defined in the acquired function information, the permitted function being also possessed by the second permitting portion's own image-processing apparatus.

According to this aspect, the image-processing apparatus can be used to execute functions within the range of the functions possessed by another image-processing apparatus storing user identification information. This enables it to provide an image-processing apparatus that facilitates setting of executable functions that are permitted on a user basis.

According to another aspect of the present invention, there is provided an image-processing apparatus mutually communicable with another image-processing apparatus, the image-processing apparatus comprising: a storing portion to store registered-user information including: user identification information for identifying a user; and function information defining functions among functions possessed by the storing portion's own image-processing apparatus, the defined functions being permitted to be executed by the user identified by the user identification information; a first registered-user-information generating portion to receive input of user identification information and function information and to generate new registered-user information including the received user identification information and the received function information; a registering portion to store the newly generated registered-user information in the storing portion; a user-identification-information receiving portion to receive input of the user identification information; and a permitting portion to permit execution of a function defined in the function information corresponding to the received user identification information on condition that registered-user information including the user identification information received by the user-identification-information receiving portion is stored in the storing portion, wherein the registering portion includes: a register-demand transmitting portion to, when storing the new registered-user information in the storing portion, transmit a register demand to another image-processing apparatus, the register demand including the user identification information and the function information; and a second registered-user-information generating portion to generate, upon reception of the register demand including the user identification information and the function information from the another image-processing apparatus, new registered-user information including the received user identification information and new function information defining, among functions defined in the received function information, functions also possessed by the second registered-user-information generating portion's own image-processing apparatus.

According to this aspect, the image-processing apparatus can be used to execute functions within the range of the functions possessed by another image-processing apparatus storing input user identification information, or another image-processing apparatus can be used to execute functions within the range of the functions possessed by the image-processing apparatus storing input user identification information. This enables it to provide an image-processing apparatus that facilitates setting of executable functions that are permitted on a user basis.

According to another aspect of the present invention, there is provided a function execution authorizing method executed in an image-processing apparatus mutually communicable with another image-processing apparatus, wherein: the image-processing apparatus includes a storing portion to store registered-user information including at least user identification information for identifying a user; and the method comprises: a step of receiving input of user identification information; a step of judging whether registered-user information including the received user identification information is stored in the storing portion; a first permitting step of permitting, when registered-user information including the received user identification information is judged to be stored in the storing portion, execution of at least one function possessed by the image-processing apparatus; a step of acquiring, when registered-user information including the received user identification information is judged not to be stored in the storing portion, function information defining at least one function possessed by another image-processing apparatus storing registered-user information including the received user identification information; and a second permitting step of permitting execution of functions among the functions defined in the acquired function information, the permitted functions being also possessed by the image-processing apparatus.

According to this aspect, the image-processing apparatus can be used to execute functions within the range of the functions possessed by another image-processing apparatus storing user identification information. This enables it to provide an image-processing apparatus that facilitates setting of executable functions that are permitted on a user basis.

According to another aspect of the present invention, there is provided a function execution authorizing method executed in an image-processing apparatus mutually communicable with another image-processing apparatus, wherein: the image-processing apparatus includes a storing portion to store registered-user information including: user identification information for identifying a user; and function information defining functions among functions possessed by the image-processing apparatus, the defined functions being permitted to be executed by the use identified by the user identification information; and the method comprises; a first generating step of receiving input of user identification information and function information and of generating new registered-user information including the received user identification information and the received function information; a step of storing the newly generated registered-user information in the storing portion; a step of receiving input of the user identification information; and a step of permitting execution of functions defined in the function information corresponding to the received user identification information on condition that registered-user information including the received user identification information is stored in the storing portion, wherein the step of storing the newly generated registered-user information in the storing portion includes: a step of transmitting, when storing the new registered-user information in the storing portion, a register demand to another image-processing apparatus, the register demand including the user identification information and the function information; and a second generating step of generating, upon reception of the register demand including the user identification information and the function information from the another image-processing apparatus, new registered-user information including the received user identification information and new function information defining, among functions defined in the received function information, functions also possessed by the image-processing apparatus.

According to this aspect, the image-processing apparatus can be used to execute functions within the range of the functions possessed by another image-processing apparatus storing input user identification information, or another image-processing apparatus can be used to execute functions within the range of the functions possessed by the image-processing apparatus storing input user identification information. This enables it to provide a function execution authorizing method that facilitates setting of executable functions that are permitted on a user basis.

According to another aspect of the present invention, there is provided a function execution authorizing program embodied in a computer readable medium, the program being executed in an image-processing apparatus mutually communicable with another image-processing apparatus, wherein: the image-processing apparatus includes a storing portion to store registered-user information including at least user identification information for identifying a user; and the program comprises: a step of receiving input of user identification information; a step of judging whether registered-user information including the received user identification information is stored in the storing portion; a first permitting step of permitting, when registered-user information including the received user identification information is judged to be stored in the storing portion, execution of at least one function possessed by the image-processing apparatus; a step of acquiring, when registered-user information including the received user identification information is judged not to be stored in the storing portion, function information defining at least one function possessed by another image-processing apparatus storing registered-user information including the received user identification information; and a second permitting step of permitting execution of functions among the functions defined in the acquired function information, the permitted functions being also possessed by the image-processing apparatus.

According to this aspect, a function execution authorizing program that is embodied in a computer readable medium and that facilitates setting of executable functions that are permitted on a user basis is provided.

According to another aspect of the present invention, there is provided a function execution authorizing program embodied in a computer readable medium, the program being executed in an image-processing apparatus mutually communicable with another image-processing apparatus, wherein: the image-processing apparatus includes a storing portion to store registered-user information including: user identification information for identifying a user; and function information defining functions among functions possessed by the image-processing apparatus, the defined functions being permitted to be executed by the use identified by the user identification information; and the program comprises: a first generating step of receiving input of user identification information and function information and of generating new registered-user information including the received user identification information and the received function information; a step of storing the newly generated registered-user information in the storing portion; a step of receiving input of the user identification information; and a step of permitting execution of functions defined in the function information corresponding to the received user identification information on condition that the registered-user information including the received user identification information is stored in the storing portion, wherein the step of storing the newly generated registered-user information in the storing portion includes: a step of transmitting, when storing the newly registered-user information in the storing portion, a register demand to another image-processing apparatus, the register demand including the user identification information and the function information; and a second generating step of generating, upon reception of the register demand including the user identification information and the function information from another image-processing apparatus, new registered-user information including the received user identification information and new function information defining, among functions defined in the received function information, functions also possessed by the image-processing apparatus.

According to this aspect, the image-processing apparatus can be used to execute functions within the range of the functions possessed by another image-processing apparatus storing user identification information, or another image-processing apparatus can be used to execute functions within the range of the functions possessed by the image-processing apparatus storing user identification information. This enables it to provide a function execution authorizing program that is embodied in a computer readable medium and that facilitates setting of executable functions that are permitted on a user basis.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A-4D are first diagrams showing examples of registered-user information.

FIGS. 7A and 7B are diagrams showing examples of function information stored in MFPs.

FIG. 8 is a first diagram showing an example of functions permitted to the user identified by the user identification information "Julie".

FIG. 9A is a second flow chart showing an example of the flow of the initial setting processing. FIG. 9B is a first flow chart showing an example of the flow of a connection processing.

FIGS. 10A-10D are second diagrams showing examples of registered-user information.

FIG. 11 is a first diagram showing an example of first user data.

FIG. 14A is a diagram showing an example of the function information of the user identification information "Julie". FIG. 14B is a diagram showing an example of function information stored in the MFP 10.

FIG. 15 is a second diagram showing an example of functions permitted to the user identified by the user identification information "Julie".

FIG. 16A is a third flow chart showing an example of the flow of the initial setting processing. FIG. 16B is a second flow chart showing an example of the flow of the connection processing.

FIG. 17 is a second diagram showing an example of first user data.

DESCRIPTION OF THE PREFERRED EMBODIMENTS

Figure 1:
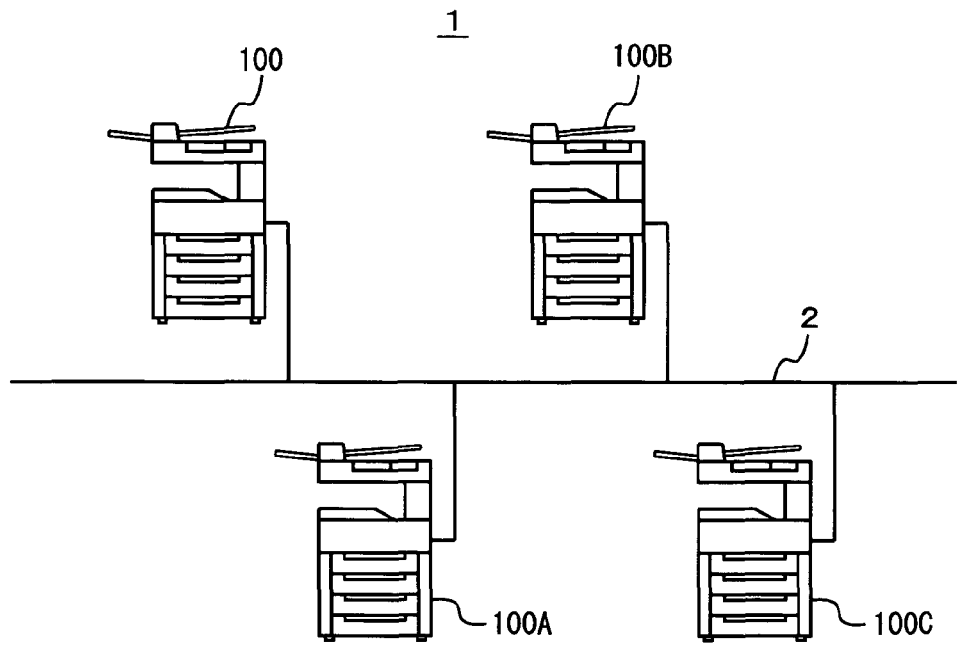
FIG. 1 is a schematic diagram of an image-processing system according to an embodiment of the present invention.

Embodiments of the present invention will be described below referring to the drawings. In the following description, parts having like functions and names will be denoted with like numerals, and therefore the description thereof will not be repeated.

First Embodiment

FIG. 1 is a schematic diagram of an image-processing system according to an embodiment of the present invention. Referring to FIG. 1, an image-processing system 1 includes compound machines (hereinafter referred to as MFPs) 100, 100A, 100B, and 100C, respectively connected to a network 2. The MFPs 100, 100A, 100B, and 100C have the same structures and functions, and therefore the MFP 100 will be taken as an example here unless stated otherwise.

The MFP (Multi Functional Peripheral) 100 includes a scanner to read text, an image-forming portion to form an image on a recording medium such as paper based on image data, and a facsimile. The MFP 100 is equipped with an image reading function, a copying function, and a facsimile transmitting and receiving function. While in this embodiment the MFP 100 is taken as an example, a scanner, a printer, a facsimile, a computer or the like can be taken as an example in place of the MFP 100.

The network 2 is a local area network (LAN), and the connection can be either by wire or radio. Also, the network 2 is not limited to a LAN and can be a wide area network (WAN), the Internet, or the like.

Figure 2:
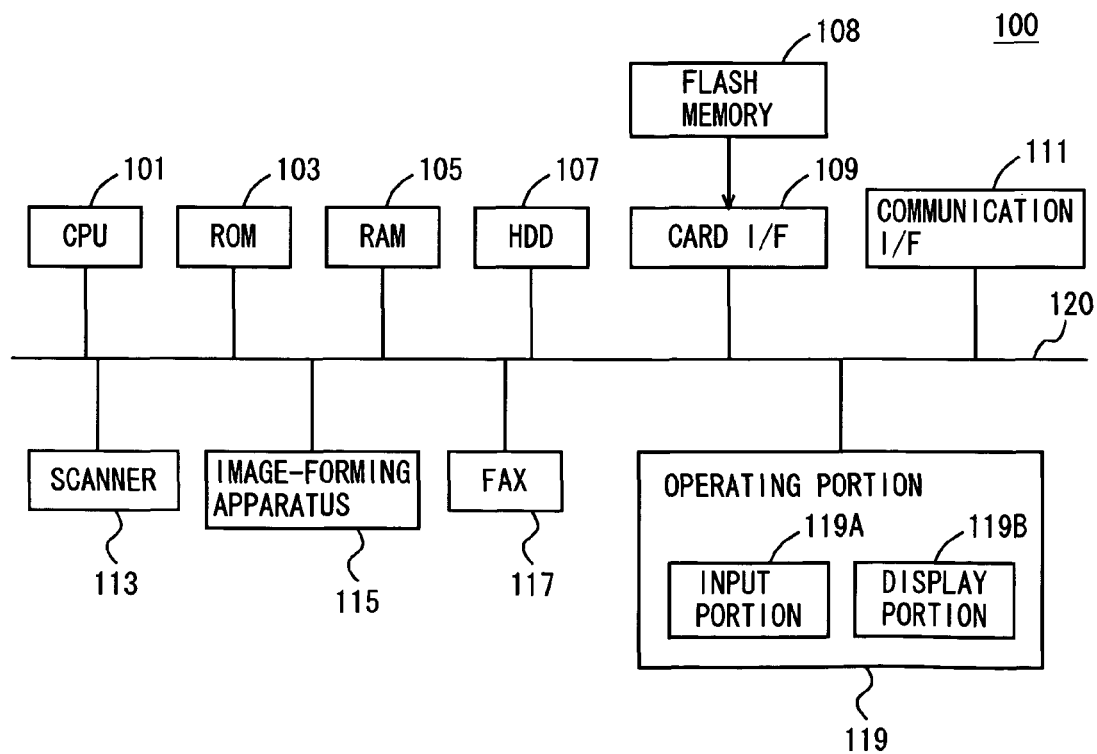
FIG. 2 is a block diagram showing an example of the hardware structure of an MFP 100.

FIG. 2 is a block diagram showing an example of the hardware structure of the MFP 100 according to this embodiment. Referring to FIG. 2, the MFP 100 includes a central processing unit (CPU) 101, a ROM (Read Only Memory) 103 for recording programs executed by the CPU 101, a RAM (Random Access Memory) 105 for loading executed programs and storing programs under execution, a hard disc drive (HDD) 107 for storing data in a nonvolatile manner, a card interface (I/F) 109 in which a flash memory 108 is mounted, a communication I/F 111 for connecting the MFP 100 to the network 2, a scanner 113, an image-forming portion 115, a facsimile (FAX) 117, and an operating portion 119 for serving as a user interface, respectively connected to a bus 120.

The CPU 101 loads in the RAM 105 a function execution authorizing program stored in the flash memory 108, which is mounted in the card I/F 109, and executes the program. The program executed by the CPU 101 is not limited to the function execution authorizing program stored in the flash memory 108. A program stored in an EEPROM (Electronically Erasable and Programmable Read Only Memory) separately connected to the CPU 101 can be loaded in the RAM 105 for execution. Using the EEPROM enables rewriting of the function execution authorizing program or additional writing of a function execution authorizing program. Thus, it is possible that another computer connected to the network 2 rewrites the function execution authorizing program stored in the EEPROM of the MFP 100, or additionally writes a new function execution authorizing program. Further, it is possible that the MFP 100 downloads a function execution authorizing program from another computer connected to the network 2 and stores the function execution authorizing program in the EEPROM.

These programs are not limited to the example where they are read out of the flash memory 108 for execution. It is possible to read out a program stored in the ROM 103. It is also possible to connect an EEPROM to the CPU 101 so that a program read out of the flash memory 108 is stored in the EEPROM and then read out for execution. It is further possible that the function execution authorizing program stored in the flash memory 108 is temporarily stored in the HDD 107, and the program is loaded, from the HDD 107, in the RAM 105 for execution.

The term program, as used herein, includes a source program, a compressed program, and an encoded program, as well as programs directly executable by the CPU 101.

The image-forming portion 115 is a laser printer or an ink jet printer, and visualizes image data on a recording medium such as paper. The scanner 113 includes a photoelectric transducer such as a CCD (Charge Coupled Device), and optically reads out text and outputs image data as electric data. The FAX 117 transmits and receives image data via the public switched telephone network (PSTN) according to facsimile standards.

The operating portion 119 includes an input portion 119A and a display portion 119B. The input portion 119A is an input device such as a touch panel, a keyboard, and a mouse, and receives input of operations from a user of the MFP 100. The display portion 119B is a liquid crystal display device or an organic EL (Electro Luminescence) display panel. When a touch panel made of a transparent member is used for the input portion 119A, the touch panel can be superposed over the display portion 119B so that button instructions displayed on the display portion 119B can be detected. This enables reception of input of various operations.

The communication I/F 111 is an interface to connect the MFP 100 to the network 2. The MFP 100 is mutually communicable with the other MFPs 100A, 100B, and 100C. While the MFP 100 is connected to the other MFPs 100A, 100B, and 100C via the network 2, direct connection is possible using a serial interface or a parallel interface. The interface used for the communication I/F 111 accords with the form in which the MFP 100 is connected to the other MFPs 100A, 100B, and 100C.

Data input into the MFP 100 includes the following cases: (1) the scanner 113 reads out text and image data is input into the MFP 100, (2) the MFP 100 receives image data from another computer connected to the network 2 via the communication I/F 111, or from the other MFPs 100A, 100B, and 100C, (3) the MFP 100 reads out, via the card I/F, image data stored in the flash memory 108, and (4) the MFP 100 receives facsimile data using the FAX 117.

Data output from the MFP 100 includes the following cases: (1) the image-forming portion 115 visualizes image data on a recording medium such as paper, (2) the MFP 100 transmits image data to another computer connected to the network 2 via the communication I/F 111, or to the other MFPs 100A, 100B, and 100C, (3) the MFP 100 stores image data in the flash memory 108, (4) the MFP 100 outputs facsimile data using the FAX 117, and (5) the MFP 100 has a display operation on the display portion 119B.

The recording medium to store the function execution authorizing program is not limited to the flash memory 108 but can be a flexible disc, a cassette tape, an optical disc (MO (Magnetic Optical Disc), MD (Mini Disc), DVD (Digital Versatile Disc)), an IC card, an optical card, or a semiconductor memory such as a Mask ROM, an EPROM, and an EEPROM.

In the image-processing system 1 according to this embodiment, the MFPs 100, 100A, 100B, and 100C each have a fixed user to mainly use each MFP. Thus, the MFPs 100, 100A, 100B, and 100C each store registered-user information for registering the main user. While the registered-user information will be described later, it includes at least user identification information for identifying the user. For the user identification information, the user's name can be used. Based on a user of interest, the MFP storing the user's registered-user information, among the MFPs 100, 100A, 100B, and 100C, will be referred to as the user's "home terminal." For example, if the registered-user information of a user named "David" is stored in the MFP 100, the home terminal of user David is the MFP 100. It is noted that storing registered-user information in each of the MFPs 100, 100A, 100B, and 100C is for the purpose of specifying the user who mainly uses each, and that a user whose registered-user information is not stored is not prohibited from using the MFPs.

It is assumed that the MFP 100 is newly connected to the network 2 while the other MFPs 100A, 100B, and 100C are already connected to the network 2. It is required to set, in the MFP 100, apparatus identification information for identifying the MFP 100 and the above-described registered-user information.

Figure 3:
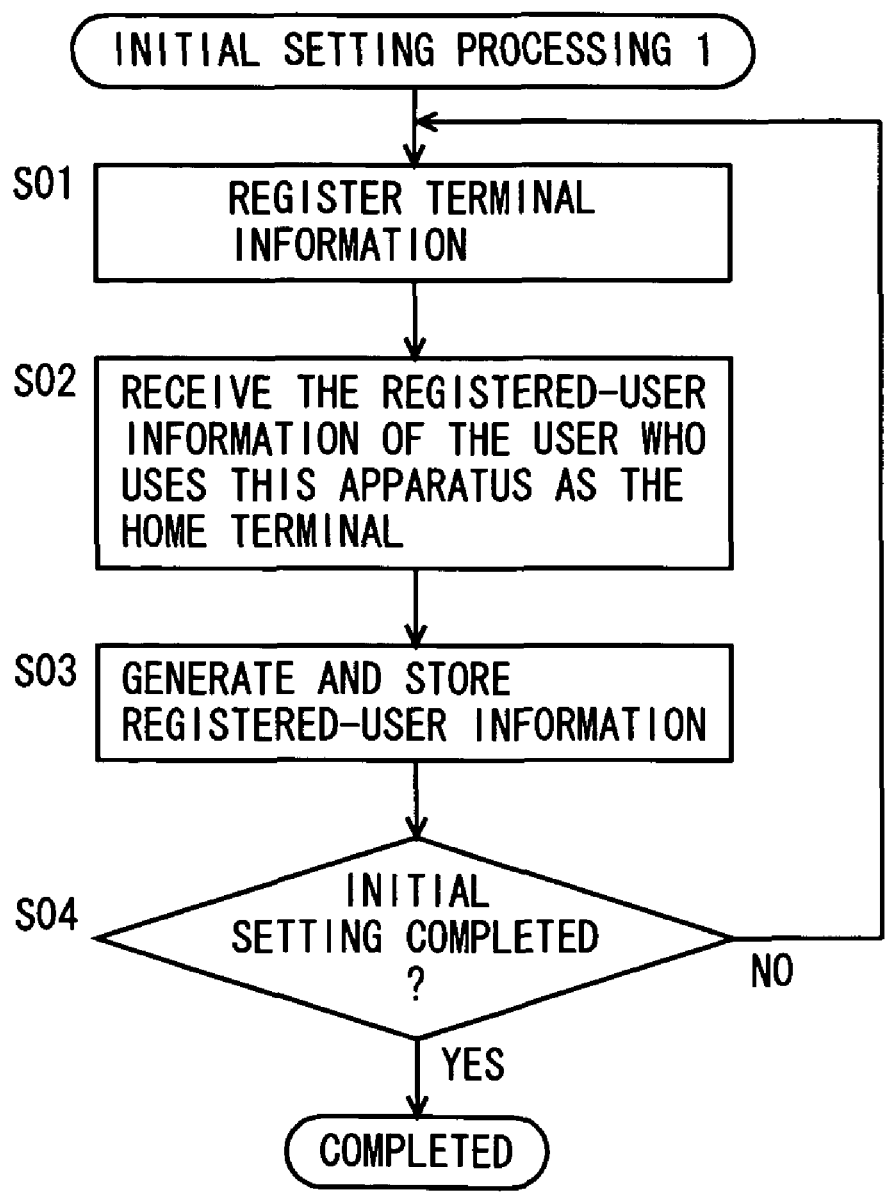
FIG. 3 is a first flow chart showing an example of the flow of an initial setting processing.

FIG. 3 is a first flow chart showing an example of the flow of an initial setting processing. The initial setting processing is executed in the MFP 100 when the MFP 100 is newly connected to the network 2. The initial setting processing is executed by the CPU 101 of each of the MFPs 100, 100A, 100B, and 100C by loading in each RAM 105 a function execution authorizing program stored in each flash memory 108 and executing the program.

Referring to FIG. 3, the MFP 100 registers terminal information (step S01). According to a terminal registration screen on the display portion 119B, the user inputs the terminal information using the operating portion 119, and the terminal information is received by the MFP 100 and stored in the HDD 107. The terminal information includes at least apparatus identification information for identifying the MFP 100. The apparatus identification information is preferably location information assigned to the MFP 100 in the network 2, and an IP (Internet Protocol) address is used here. The terminal information may include information indicating the location where the MFP 100 is mounted.

Next, the MFP 100 receives the registered-user information of the user who uses the MFP 100 as the home terminal (step S02). According to a registered-user-information input screen on the display portion 119B, the user inputs the user's registered-user information using the operating portion 119, and the registered-user information is received by the MFP 100. When a plurality of users use the MFP 100 as the home terminal, the registered-user information of each user is input. The registered-user information includes at least user identification information for identifying the user. The user identification information is unique information such as a user ID composed of characters and symbols, and the user's name. The user's name is used for the user's user identification information here. The registered-user information may include personal information as well as the user identification information. The personal information is related to the user and includes authentication information such as a password.

The MFP 100 then generates registered-user information from the received user identification information and the received personal information, and stores the registered-user information in the HDD 107 (step S03). The registration of the terminal information in step S01 and reception of the registered-user information in step S02 are usually executed when the controller of the MFP 100 operates the MFP 100. The MFP 100 then judges whether the initial setting is completed (step S04). When the initial setting is completed, the processing terminates, and when the initial setting is not completed, the processing goes back to step S01. When the user accepts an instruction of a completion button displayed on the display portion 119B, the CPU 101 detects the completion of the initial setting.

FIG. 4A is a diagram showing an example of registered-user information stored in the MFP 100. FIG. 4B is a diagram showing an example of registered-user information stored in the MFP 100A. FIG. 4C is a diagram showing an example of registered-user information stored in the MFP 100B. FIG. 4D is a diagram showing an example of registered-user information stored in the MFP 100C. The registered-user information includes a number, user identification information, and personal information. The personal information includes authentication information. The authentication information is information used for authentication of the user at the time of login, and a password is used here. Face image data can be used for the authentication information. When the authentication information is by biometrics, then fingerprints, voiceprints, iris patterns, vein patterns, or the like are used. The personal information can include associated information. The associated information is information associated with the user such as the department the user belongs to, an electronic mail address assigned to the user, and face image data obtained by photographing the user's face.

In this embodiment, as the registered user who uses the MFP 100 as the home terminal, the user identification information "David" is registered. As the registered user who uses the MFP 100A as the home terminal, the user identification information "Julie" is registered. As the registered user who uses the MFP 100B as the home terminal, the user identification information "Ted" is registered. As the registered user who uses the MFP 100C as the home terminal, the user identification information "Michael" and "Suzan" is registered.

A user executes a login operation in order to operate one of the MFPs 100, 100A, 100B, and 100C. Specifically, the login operation is executed by inputting the user identification information of the user. An MFP, among the MFPs 100, 100A, 100B, and 100C, to which the user executes the login operation will be hereinafter referred to as an operated terminal. For simplicity of description, the case where the user identified by the user identification information "Julie", who uses the MFP 100A as the user's home terminal, executes the login operation to the MFP 100 will be described. In this case, the MFP 100 is an operated terminal and the MFP 100A is the user's home terminal.

Figure 5:
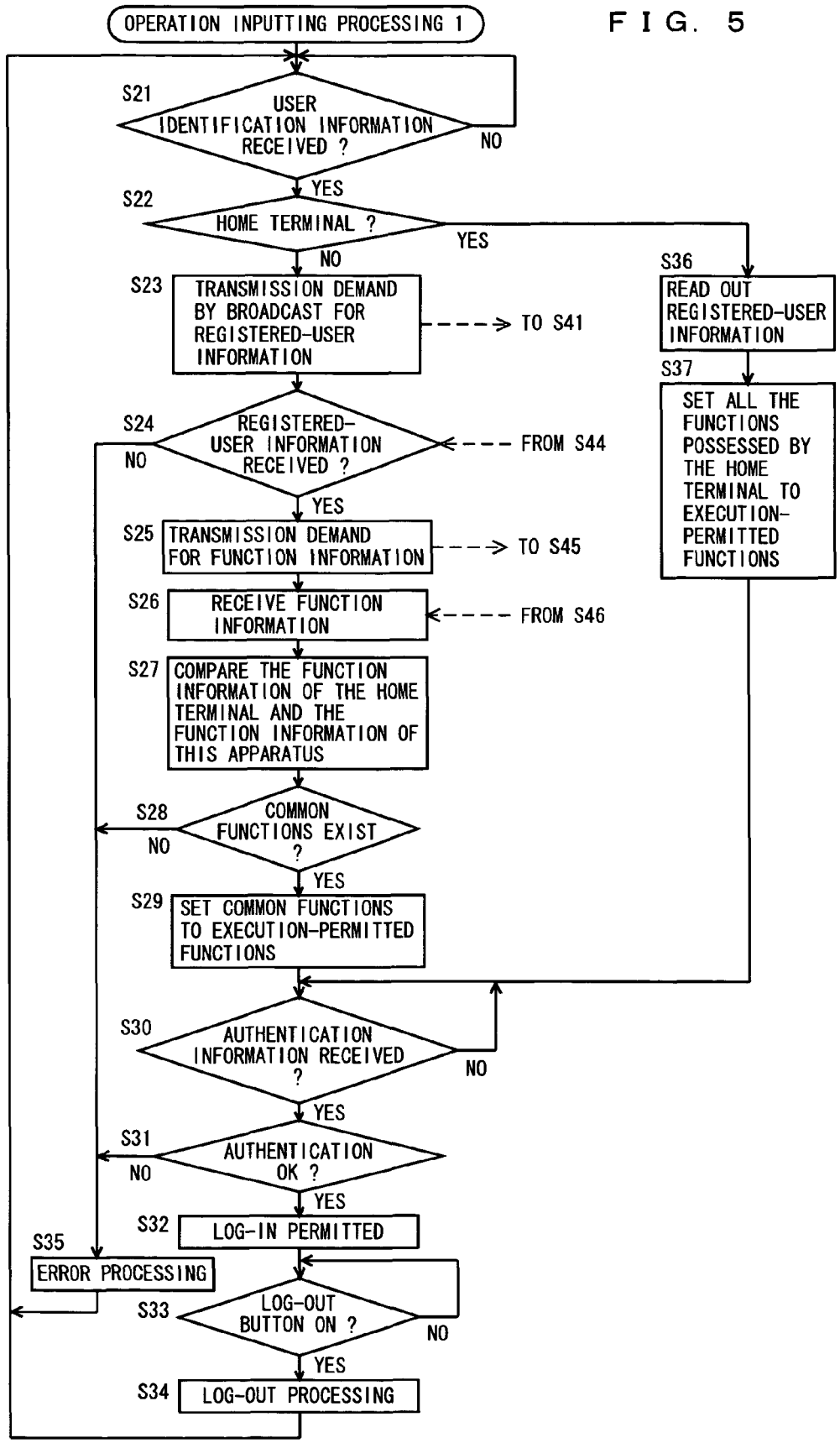
FIG. 5 is a first flow chart showing the flow of an operation inputting processing.
Figure 6:
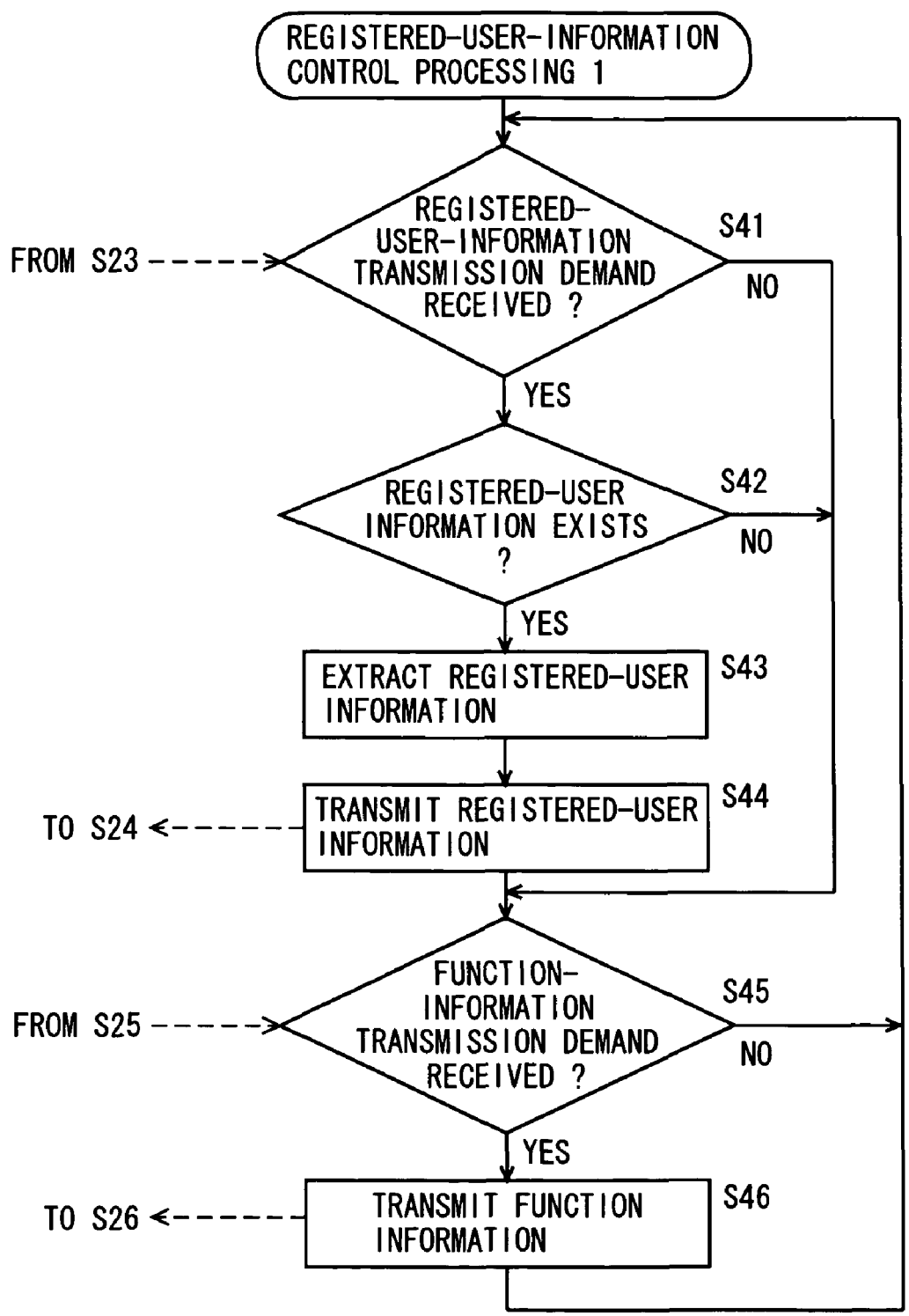
FIG. 6 is a first flow chart showing the flow of a registered-user-information control processing.

FIG. 5 is a first flow chart showing the flow of an operation inputting processing. FIG. 6 is a first flow chart showing the flow of a registered-user-information control processing. The operation inputting processing is executed in an operated terminal, among the MFPs 100, 100A, 100B, and 100C, that is operated by the user. The registered-user-information control processing is executed in an MFP, among the MFPs 100, 100A, 100B, and 100C, that is not the operated terminal. The operation inputting processing and the registered-user-information control processing are executed by the CPU 101 of each of the MFPs 100, 100A, 100B, and 100C by loading in each RAM 105 a function execution authorizing program stored in each flash memory 108 and executing the program.

Referring to FIGS. 5 and 6, the CPU 101 of the MFP 100, which is an operated terminal, judges whether input of user identification information is received (step S21). When the user identification information is received, the processing proceeds to step S22. When the user identification information is not received, the MFP 100 turns into a stand-by state. That is, the operated terminal executes steps S22 and thereafter on condition that user identification information is input.

Since the user identification information "Julie" is received here, the processing proceeds to step S22. In step S22, the CPU 101 judges, from the received user identification information, whether the MFP 100 is the home terminal of the user. Specifically, the CPU 101 searches, using the received user identification information, the registered-user information stored in the HDD 107 of the MFP 100 in order to judge whether the HDD 107 stores registered-user information including the received user identification information. When the HDD 107 stores registered-user information including the received user identification information, the CPU 101 judges that the MFP 100 is the home terminal of the user to which the received user identification information is assigned, and the processing proceeds to step S36. When the HDD 107 does not store registered-user information including the received user identification information, the CPU 101 judges that the MFP 100 is not the home terminal of the user to which the received user identification information is assigned, and the processing proceeds to step S23. Since the MFP 100 is not the home terminal of the user identified by the received user identification information "Julie" here, the processing proceeds to step S23.

In step S36, the CPU 101 reads out, from the HDD 107, the registered-user information including the user identification information received in step S21, and the processing proceeds to step S37. In step S37, the CPU 101 sets all the functions possessed by the CPU's own apparatus (the MFP 100 here) to execution-permitted functions, and the processing proceeds to step S30. An execution-permitted function is a function that the user identified by the received in step S21 is permitted to execute.

In step S23, the CPU 101 outputs, by broadcast, a transmission demand to the network 2 to demand transmission of registered-user information. This transmission demand includes at least the user identification information. This transmission demand is received by all the MFPs excluding the MFP 100, which is the operated terminal. The CPU 101 then judges whether registered-user information is received in response to the transmission demand transmitted in step S23 (step S24). When registered-user information is received, the processing proceeds to step S25. When registered-user information is not received, the processing proceeds to step S35. In step S35, the CPU 101 executes an error processing. The error processing includes displaying a message on the display portion 119B denoting that the user cannot log in.

In step S25, the CPU 101 transmits a function-information transmission demand to demand the MFP that has transmitted the registered-user information, i.e., the home terminal (the MFP 100A here), to transmit function information. After transmitting the function-information transmission demand, the CPU 101 receives the function information of the home terminal (step S26). The function information defines the functions possessed by an MFP and is stored in the HDD 107 of each of the MFPs 100, 100A, 100B, and 100C.

The CPU 101 then compares the received function information of the home terminal with the function information of the CPU's own apparatus (step S27). In the next step S28, the CPU 101 judges whether there are identical functions in the function information of the home terminal and the function information of the CPU's own apparatus. When there are identical functions, the processing proceeds to step S29. When there are no identical functions, the processing proceeds to step S35. In step S29, the identical functions are set to execution-permitted functions, and the processing proceeds to step S30.

Referring to FIG. 6, the other MFPs than the operated terminal judge whether a transmission demand for registered-user information is received (step S41). When the transmission demand is received, the processing proceeds to step S42. Otherwise, the processing proceeds to step S45. In step S42, the other MFPs than the operated terminal search, using the user identification information included in the transmission demand, the registered-user information stored in each HDD 107 in order to judge whether there is registered-user information including the received user identification information. When there is such registered-user information, the processing proceeds to step S43. When there is no such registered-user information, the processing proceeds to step S45. When the MFP to execute a registered-user-information control processing is the home terminal (the MFP 100A here), the processing proceeds to step S43. When the registered-user-information control processing is executed by some other MFP (the MFP 100B or the MFP 100C here) than the home terminal, the processing proceeds to step S45. In step S43, the MFP 100A extracts the registered-user information including the user identification information. The MFP 100A then transmits the extracted registered-user information to the operated terminal (the MFP 100 here), which has transmitted the transmission demand (step S44).

In step S45, the MFP 100A judges whether a function-information transmission demand is received. When the function-information transmission demand is received, the processing proceeds to step S46. Otherwise, the processing goes back to step S41. In step S46, the MFP 100A transmits function information defining the functions possessed by the MFP 100A to the operated terminal (the MFP 100 here), which has transmitted the function-information transmission demand.

Referring back to FIG. 5, in step S30, the CPU 101 of the MFP 100 demands the user to input authentication information by screen displaying or voice outputting, and the MFP 100 turns into a stand-by state until input of authentication information ("NO" in step S30). When authentication information is input, the processing proceeds to step S31. In step S31, the CPU 101 compares the authentication information received in step S30 with the authentication information included in the received registered-user information. When both pieces of authentication information are identical, the user is authenticated, and the processing proceeds to step S32. When both pieces of authentication information are not identical, the processing proceeds to step S35.

Step S31 can be executed in the home terminal. In this case, in step S31, the CPU 101 of the MFP 100 transmits the user identification information and the authentication information received in step S30 to the home terminal, and receives an authentication result from the home terminal. In step S43, the home terminal compares the authentication information in the extracted registered-user information with the authentication information received from the operated terminal in order to judge whether the user is authenticated, and transmits the result of the judgment as an authentication result to the operated terminal.

In step S32, the CPU 101 permits login of the user identified by the user identification information received in step S21. Upon permission of the user's login, operations to execute the execution-permitted functions set in step S29 or the execution-permitted functions set in step S37 are accepted, and the functions corresponding to the accepted operations are executed. In other words, operations to execute functions set to execution-permitted functions are accepted, and execution of the functions corresponding to the accepted operations is permitted. On the other hand, operations to execute functions not set to execution-permitted functions are not accepted, and execution of the functions corresponding to the unaccepted operations is prohibited. Thus, when an operated terminal that a user logs in is not the user's home terminal, functions possessed by the home terminal and by the operated terminal are permitted for execution.

In the next step S33, the CPU 101 judges whether the logout button is turned on. The MFP 100 turns into a stand-by state until the logout button is pressed to turn it on ("NO" in step S33). When the logout button is turned on, the processing proceeds to step S34. In step S34, the CPU 101 executes a logout processing, and the processing goes back to step S21. The logout processing includes turning the screen on the display portion 119B back into an initial screen and setting parameters for the MFP 100 back to initial values.

FIG. 7A is a diagram showing an example of the function information stored in the MFP 100A. FIG. 7B is a diagram showing an example of the function information stored in the MFP 100. Referring to FIG. 7A, the function information stored in the MFP 100A defines the functions possessed by the MFP 100A. Referring to FIG. 7B, the function information stored in the MFP 100 defines the functions possessed by the MFP 100. In FIGS. 7A and 7B, the functions common among the functions possessed by the MFP 100A and the functions possessed by the MFP 100 are highlighted by hatching.

FIG. 8 is a first diagram showing an example of functions permitted to the user identified by the user identification information "Julie". FIG. 8 shows the functions that the user identified by the user identification information "Julie" is permitted to execute in the operated terminal MFP 100 when the user logs in the MFP 100, which is not the user's home terminal (MFP 100A). The functions common among the functions defined in the function information stored in the MFP 100A and shown in FIG. 7A and the functions defined in the function information stored in the MFP 100 and shown in FIG. 7B are the functions that the user identification information "Julie" is permitted to execute in the operated terminal MFP 100.

As described hereinbefore, each of the MFPs 100, 100A, 100B, and 100C in the first embodiment stores in the HDD 107 registered-user information including at least user identification information. When each of the MFPs 100, 100A, 100B, and 100C receives input of user identification information, each judges whether registered-user information including the received user identification information is stored in the HDD 107. When an MFP among the MFPs 100, 100A, 100B, and 100C judges that such registered-user information is stored in the HDD 107, that MFP permits execution of its functions (step S37). When the MFP judges that such registered-user information is not stored in the HDD 107, that MFP acquires the function information of the home terminal, among the MFPs 100, 100A, 100B, and 100C, that stores registered-user information including the received user identification information (step S26). Then, the MFP permits execution of the functions, among the functions defined in the function information of the home terminal, that are also possessed by the MFP itself, which is an operated terminal (step S29). Thus, by storing user identification information in either one of the MFPs 100, 100A, 100B, and 100C, which are connected to the network 2, the one MFP becomes the home terminal of the user identified by the user identification information. When the user of the home terminal logs in some other MFP than the home terminal, the other MFP can execute functions within the range of the functions possessed by the home terminal. Thus, by the simple operation of storing user identification information in either one of the MFPs 100, 100A, 100B, and 100C, an MFP other than the one MFP can be used to execute functions within the range of the functions possessed by the one MFP, which is the home terminal.

Second Embodiment

Next, an image-processing system according to a second embodiment will be described. The image-processing system according to the second embodiment limits functions that the registered user in each of the MFPs 100, 100A, 100B, and 100C is permitted to execute. Description will be made below mainly of different points from the image-processing system 1 in the first embodiment.

In an image-processing system 1 according to the second embodiment, each of the MFPs 100, 100A, 100B, and 100C stores user data including all the user identification information stored in the other MFPs so that a user whose registered-user information is stored in the user's home terminal can log in other MFPs than the home terminal. The user data of each MFP includes at least all the user identification information stored in the other MFPs.

A processing for generating the user data will be described. It is assumed that the MFP 100 is newly connected to the network 2 while the other MFPs 100A, 100B, and 100C are already connected to the network 2. It is required to set, in the MFP 100, apparatus identification information for identifying the MFP 100 and the above-described registered-user information. When the apparatus identification information and the registered-user information are set in the MFP 100, the MFP 100 transmits the apparatus identification information and the registered-user information to the other MFPs 100A, 100B, and 100C. Thus, an image-processing system 1 composed of the MFPs 100, 100A, 100B, and 100C is formed.

FIG. 9A is a second flow chart showing an example of the flow of the initial setting processing. The initial setting processing is executed in the MFP 100 when the MFP 100 is newly connected to the network 2. FIG. 9B is a first flow chart showing an example of the flow of a connection processing. The connection processing is executed in each of the MFPs 100A, 100B, and 100C, which are already connected to the network 2, when the MFP 100 is newly connected to the network 2. The initial setting processing and the connection processing are executed by the CPU 101 of each of the MFPs 100, 10A, 100B, and 100C by loading a function execution authorizing program stored in each flash memory 108 and executing the program.

Referring to FIG. 9A, step S51 is the same as step S01 shown in FIG. 3, and thus description thereof will not be repeated. In step S52, the CPU 101 of the MFP 100 receives input of the registered-user information of the user who uses the MFP 100 as the user's home terminal. The registered-user information includes at least user identification information and function information. The function information defines functions that the user identified by the user identification information is permitted to execute. The registered-user information may further include personal information and disclosability information. The personal information includes authentication information. The disclosability information is information denoting whether to disclose the registered-user information to the other MFPs.

The CPU 101 of the MFP 100 then generates registered-user information from the received user identification information and the received function information, and stores the registered-user information in the HDD 107 (step S53). Then, the CPU 101 judges whether the initial setting is completed (step S54). When the initial setting is completed, the processing proceeds to step S55. When the initial setting is not completed, the processing goes back to step S51.

In step S55, the CPU 101 transmits the terminal information and the user identification information that have been subjected to the initial setting to the MFPs of the same group. The term same group refers to a collection of the MFPs constituting the image-processing system 1. Here the MFPs 100, 100A, 100B, and 100C, which are connected to the network 2, are the same group. Thus, the MFP 100 transmits an inquiry to the network 2 by broadcast, and receives an IP address transmitted, in response to the inquiry, by each of the MFPs 100A, 100B, and 100C, which are the same group. In this manner, the MFP 100 acquires the IP addresses of the MFPs constituting the same group. Also, grouping enables it to classify the plurality of MFPs 100, 100A, 100B, and 100C, which are connected to the network 2, into different groups. For example, the MFPs 100 and 100A constitute one group and the MFPs 100B and 100C constitute another group. It is the user who sets the grouping. Specifically, the MFP 100 receives the IP addresses of the MFPs 100A, 100B, and 100C and thus detects the MFPs 100A, 100B, and 100C. Then, the user designates an MFP among the MFPs 100A, 100B, and 100C to be the same group as the MFP 100. In this manner, apparatuses to be the same group are specified.

The MFP 100 transmits its apparatus identification information and user identification information to one MFP chosen from the MFPs 100A, 100B, and 100C, which are the same group as the MFP 100. The following description is about the case where the MFP 100A is chosen and the apparatus identification information and the user identification information of the MFP 100 are transmitted from the MFP 100 to the MFP 100A.

Referring now to FIG. 9B, the MFP 100A judges whether the apparatus identification information and the user identification information transmitted from the MFP 100 are received (step S61). When the apparatus identification information and the user identification information are received, the processing proceeds to step S62. Otherwise, the processing is discontinued. That is, the connection processing is executed on condition that a demand from the MFP 100 that has executed the initial setting processing is received. In step S62, the CPU 101 of the MFP 100A extracts registered-user information, among sets of registered-user information stored in the HDD 107 of the MFP 100A, in which the disclosability information is set to "OK" ("YES" in step S62). In other words, registered-user information, among sets of registered-user information stored in the HDD 107 of the MFP 100A, in which the disclosability information is set to "NG" is not extracted. The CPU 101 of the MFP 100A then transmits to the MFP 100 the user identification information and the apparatus identification information included in the extracted registered-user information (step S63). In the next step S64, the CPU 101 of the MFP 100A generates user data from the apparatus identification information and the user identification information of the MFP 100 received in step S61, and adds the generated user data to user data already stored in the HDD 107.

Referring back to FIG. 9A, the MFP 100 receives the apparatus identification information and the user identification information of the MFP 100A transmitted from the MFP 100A (step S56). Then, the MFP 100 judges whether there is an MFP in the same group to which the MFP 100 has not transmitted its apparatus identification information and user identification information (step S57). When such an MFP exists, the MFP is chosen and the processing goes back to step S55. When such an MFP does not exist, the processing proceeds to step S58. Since the MFP 100 has not transmitted its apparatus identification information and user identification information to the MFPs 100B and 100C, either MFP 100B or MFP 100C is chosen and the processing goes back to step S55. In this manner, the MFP 100 transmits its apparatus identification information and user identification information to an MFP of the same group in a one-by-one manner (step S55), and receives from the MFP its apparatus identification information and user identification information (step S56). While the MFP 100 chooses an MFP of the same group in a one-by-one manner and transmits the apparatus identification information and the user identification information of the MFP 100 to the chosen MFP, it is also possible that the MFP 100 transmits by broadcast its apparatus identification information and user identification information and receives the apparatus identification information and the user identification information stored in each of the MFPs 100A, 100B, and 100C from each of the MFPs 100A, 100B, and 100C.

In step S58, the CPU 101 of the MFP 100 judges whether the registered-user information of the CPU's own apparatus is used for generating user data. The judgment can be based on the user's selection or can be predetermined. When it is judged that the registered-user information of the CPU's own apparatus is used, the processing proceeds to step S59. When it is judged that the registered-user information of the CPU's own apparatus is not used, the processing skips step S59 and proceeds to step S60. In step S59, the registered-user information stored in the MFP 100 is read out. In step S60, the CPU 101 generates user data from apparatus identification information and user identification information. When step S59 is skipped, sets of user data are generated respectively from pieces of apparatus identification information and pieces of user identification information received from the MFPs 100A, 100B, and 100C. When step S59 is executed, sets of user data are generated from pieces of user identification information received from the MFPs 100A, 100B, and 100C, the registered-user information stored in the MFP 100, and the pieces of apparatus identification information of the MFPs 100, 100A, 100B, and 100C. Each set of user data includes the apparatus identification information and user identification information of each MFP. While in this embodiment the user data includes apparatus identification information and user identification information, the user data may include at least user identification information. The user data generated when the MFP 100 judges to use its own registered-user information in step S58 will be referred to as first user data. The user data generated when the MFP 100 judges not to use its own registered-user information in step S58 will be referred to as second user data. The generated user data is stored in the HDD 107 of the MFP 100.

When first user data is generated in all the MFPs 100, 100A, 100B, and 100C, the MFPs 100, 100A, 100B, and 100C store the same user data. When the MFP 100A generates second user data, the second user data includes sets of user data respectively associating pieces of apparatus identification information of the MFPs 100, 100B, and 100C with sets of registered-user information stored in the MFPs 100, 100B, and 100C. When the MFP 100B generates second user data, the second user data includes sets of user data respectively associating pieces of apparatus identification information of the MFPs 100, 100A, and 100C with sets of registered-user information stored in the MFPs 100, 100A, and 100C. When the MFP 100C generates second user data, the second user data includes sets of user data respectively associating pieces of apparatus identification information of the MFPs 100, 100A, and 100B with sets of registered-user information stored in the MFPs 100, 100A, and 100B.

While the registration processing of the apparatus identification information and the registration processing of the registered-user information are executed in the initial setting processing executed in the MFP 100, the same are executed when the MFP 100 is already connected to the network 2 and a user is added. In this case, however, the registration processing of the apparatus identification information in step S01 is not necessary.

The execution of the initial setting processing is not limited to the case where one of the MFPs 100, 100A, 100B, and 100C is connected to the network 2. The initial setting processing can be executed after power is input into one of the MFPs 100, 100A, 100B, and 100C, or at predetermined time intervals. As one reason, for example, when a new user is registered in the MFP 100, the registered-user information of the new user is transmitted to the other MFPs 100A, 100B, and 100C, so that the latest user data can be stored in the other MFPs 100A, 100B, and 100C. In this case, the MFP 100 does not execute step S51 and step S53 of the initial setting processing shown in FIG. 9A, but executes step S52, which is the inputting processing of the registered-user information. Conversely, as another reason, the MFP 100 acquires the registered-user information of a user newly registered in one of the other MFPs 100A, 100B, and 100C, so that the MFP 100 can store the latest user data. In this case, the MFP 100 does not execute steps S51-S53 of the initial setting processing shown in FIG. 9A, but demands the one of the other MFPs 100A, 100B, and 100C to transmit the user identification information of the one MFP. The transmission demand for the user identification information includes at least the apparatus identification information. In response to the transmission demand, the other MFPs 100A, 100B, and 100C execute the connection processing shown in FIG. 9B. In step S61, in response to the received transmission demand, the other MFPs 100A, 100B, and 100C transmit the registered-user information stored in each HDD 107 to the MFP 100, which has transmitted the transmission demand. Thus, in the case of a change in the registered-user information stored in the HDD 107 of any of the other MFPs 100A, 100B, and 100C, user data is generated from the changed registered-user information and stored in the HDD 107 of the MFP 100. In this case, the other MFPs 100A, 100B, and 100C do not have to execute step S64 of the connection processing.

FIG. 10A is a second diagram showing an example of the registered-user information stored in the MFP 100. FIG. 10B is a second diagram showing an example of the registered-user information stored in the MFP 100A. FIG. 10C is a second diagram showing an example of the registered-user information stored in the MFP 100B. FIG. 10D is a second diagram showing an example of the registered-user information stored in the MFP 100C. The registered-user information includes user identification information, personal information, function information, and disclosability information. The personal information includes authentication information. The personal information may include associated information. The function information defines functions that a user identified by the user identification information is permitted to execute. The disclosability information denotes whether to disclose the registered-user information. When the disclosability information is set to "OK", the user identification information included in the registered-user information is disclosed to the other MFPs. When the disclosability information is set to "NG", the registered-user information is not disclosed to the other MFPs. Thus, when the disclosability information is set to "OK", the user identified by the user identification information defined in the registered-user information is permitted to log in the other MFPs. When, however, the disclosability information is set to "NG", the user is not permitted to log in the other MFPs.

In this embodiment, the user identification information "David" is registered as the registered user to use the MFP 100 as the home terminal, the user identification information "Julie" is registered as the registered user to use the MFP 100A as the home terminal, the user identification information "Ted" is registered as the registered user to use the MFP 100B as the home terminal, and the pieces of user identification information "Michael" and "Suzan" are registered as the registered users to use the MFP 100 as the home terminal. The disclosability information is set to "NG" for the user identification information "Suzan" and "OK" for the other users.

FIG. 11 is a first diagram showing an example of first user data. The first user data is generated in the MFPs 100, 100A, 100B, and 100C by executing the initial setting processing, shown in FIG. 9A, in the MFP 100 and the connection processing, shown in FIG. 9B, in the MFPs 100A, 100B, and 100C, and stored in the MFPs 100, 100A, 100B, and 100C. The first user data includes a number, registered-user information, and the apparatus identification information of the home terminal of each user. The first user data is composed of four sets of user data including the pieces of user identification information of the users who respectively use the MFPs 100, 100A, 100B, and 100C as the users' home terminals. The user identification information "Suzan", which identifies the user who uses the MFP 100C as the user's home terminal, is not included.

Thus, when the MFP 100 executes the initial setting processing, the same first user data is generated and stored in the MFPs 100, 100A, 100B, and 100C, which are the same group. Thus, an image-processing system 1 composed of the MFPs 100, 100A, 100B, and 100C is formed. Formation of the image-processing system 1 enables it to identify a user who uses either one of the MFPs 100, 100A, 100B, and 100C as the user's home terminal. A user who uses either one of the MFPs 100, 100A, 100B, and 100C as the user's home terminal is permitted to log in an operated terminal, among the MFPs 100, 100A, 100B, and 100C, by inputting the user's user identification information into the operated terminal.

Figure 12:
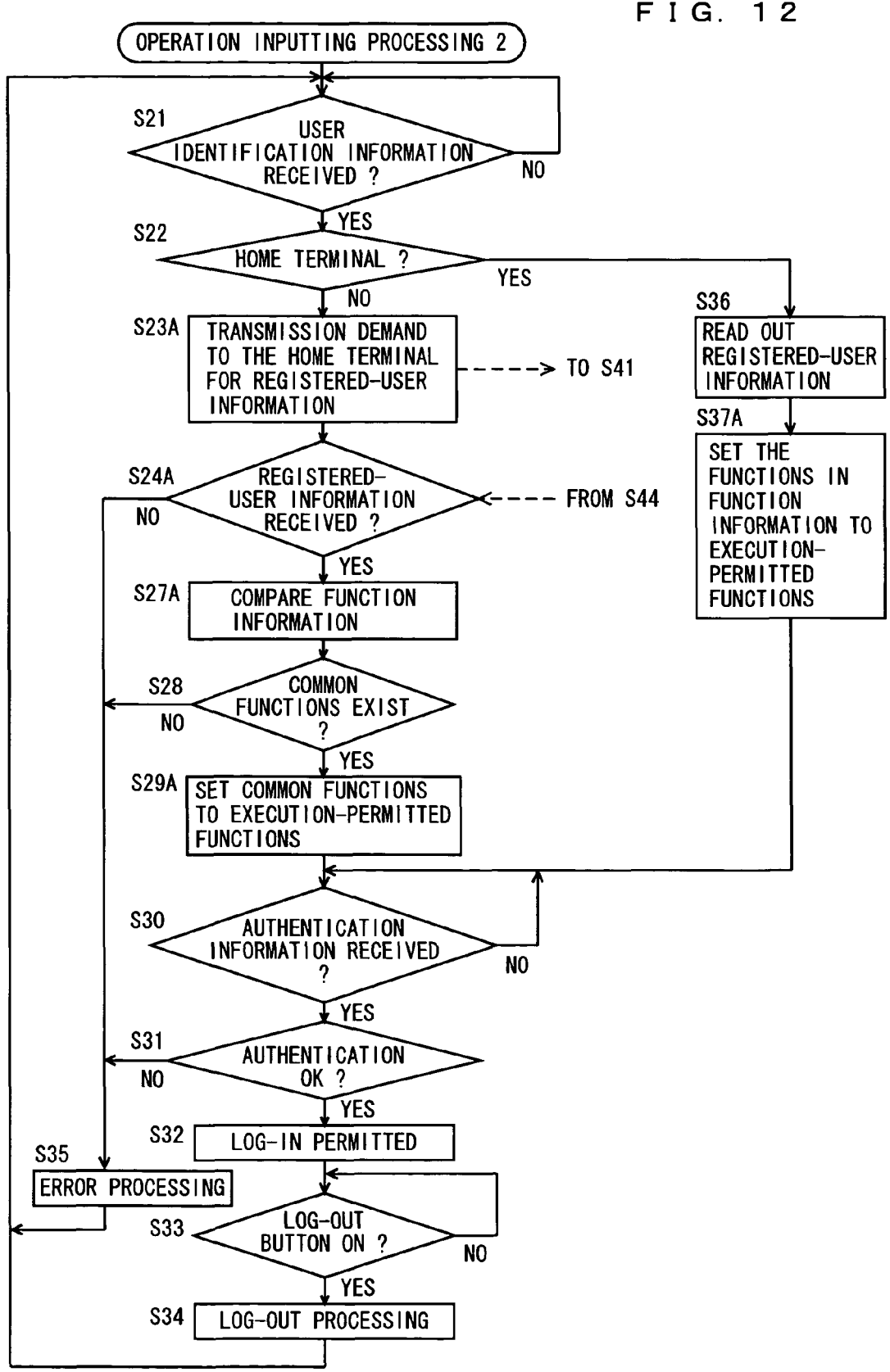
FIG. 12 is a second flow chart showing the flow of the operation inputting processing.
Figure 13:
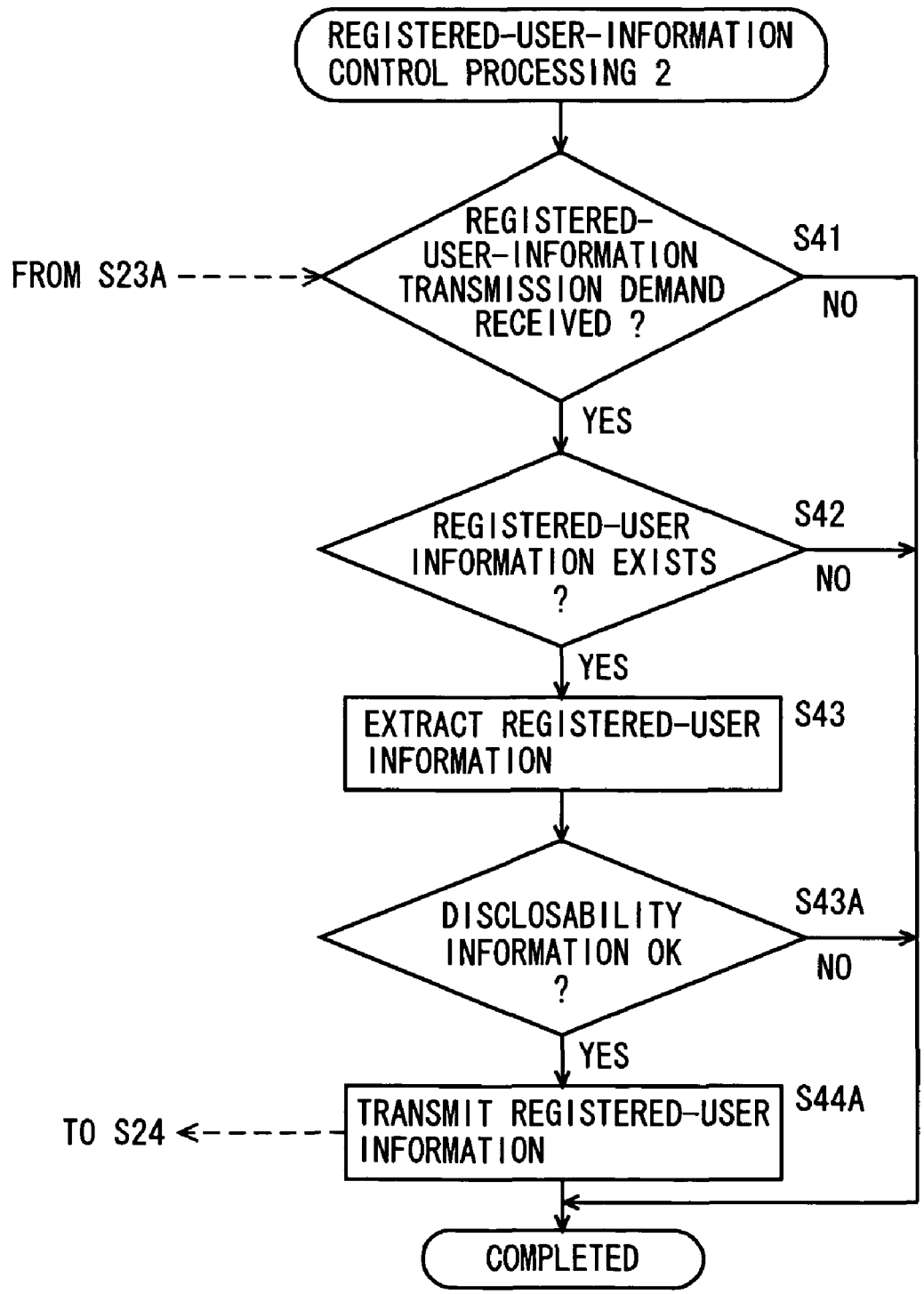
FIG. 13 is a second flow chart showing the flow of the registered-user-information control processing.

FIG. 12 is a second flow chart showing the flow of the operation inputting processing. The operation inputting processing is executed in an operated terminal, among the MFPs 100, 100A, 100B, and 100C, that a user intends to operate. FIG. 13 is a second flow chart showing the flow of the registered-user-information control processing. The registered-user-information control processing is executed in the user's home terminal. The operation inputting processing and the registered-user-information control processing are executed by the CPU 101 of each of the MFPs 100, 100A, 100B, and 100C by loading in each RAM 105 a function execution authorizing program stored in each flash memory 108 and executing the program. Here the example where the user identified by the user identification information "Julie" uses the MFP 100 as an operated terminal and inputs the user identification information into the MFP 100 will be described.

In the operation inputting processing shown in FIGS. 5 and 12, like steps are denoted with like numerals. In the registered-user-information control processing shown in FIGS. 6 and 13, like steps are denoted with like numerals. Description will be made mainly of different points in FIGS. 12 and 13 from the operation inputting processing shown in FIG. 5 and the registered-user-information control processing shown in FIG. 6, respectively.

Referring to FIG. 12, the CPU 101 of the MFP 100 judges whether input of the user identification information of the user identified by the user identification information "Julie" is received (step S21). When the user identification information is received, the processing proceeds to step S22. Otherwise, the MFP 100 turns into a stand-by state. That is, the operated terminal executes steps S22 and thereafter on condition that user identification information is input. In step S22, the CPU 101 judges, from the received user identification information, whether the MFP 100 is the home terminal of the user. Specifically, the CPU 101 searches, using the received user identification information, the registered-user information stored in the HDD 107 of the MFP 100 in order to judge whether the HDD 107 stores registered-user information including the received user identification information. When the HDD 107 stores registered-user information including the received user identification information, the CPU 101 judges that the MFP 100 is the home terminal of the user to which the received user identification information is assigned, and the processing proceeds to step S36. When the HDD 107 does not store registered-user information including the received user identification information, the CPU 101 judges that the MFP 100 is not the home terminal of the user to which the received user identification information is assigned, and the processing proceeds to step S23A. Since the MFP 100 is not the home terminal of the user identified by the received user identification information "Julie" here, the processing proceeds to step S23A.

In step S36, the CPU 101 of the MFP 100 searches the registered-user information stored in the HDD 107 in order to read out registered-user information including the user identification information received in step S21, and the processing proceeds to step S37A. In step S37A, the CPU 101 sets the functions defined in the function information of the registered-user information read out in step S36 to execution-permitted functions, and the processing proceeds to step S30.

When the CPU 101 judges that the MFP 100 is not the home terminal of the user in step S22, the CPU 101 transmits, in step S23A, a transmission demand to the home terminal of the user identified by the user identification information received in step S21 to demand transmission of registered-user information. The transmission demand includes at least the user identification information. Specifically, the CPU 101 extracts user data including the user identification information "Julie", received in step S21, and identifies the home terminal of the user identification information "Julie" from the apparatus identification information included in the extracted user data. Then, the CPU 101 transmits a transmission demand to the MFP 100A, which is identified by the apparatus identification information, to demand transmission of the registered-user information of the user identification information "Julie".

Referring to FIG. 13, the MFP 100A, which is the home terminal of the user, judges whether a transmission demand for registered-user information is received (step S41). When the transmission demand is received, the processing proceeds to step S42. Otherwise, the processing is discontinued. In step S42, the MFP 100A searches, using the user identification information included in the transmission demand, the registered-user information stored in the HDD 107 of the MFP 100A in order to judge whether there is registered-user information including the received user identification information. When there is such registered-user information, the processing proceeds to step S43. When there is no such registered-user information, the processing is discontinued.

In step S43, the MFP 100A extracts the registered-user information including the user identification information included in the received transmission demand. In the next step S43A, the MFP 100A judges whether the disclosability information of the extracted registered-user information is set to "OK". When the disclosability information is set to "OK", the processing proceeds to step S44A. When the disclosability information is set to "NG", the processing is discontinued. In step S44A, the MFP 100A transmits the extracted user information to the operated terminal that has transmitted the transmission demand.

Referring back to FIG. 12, the operated terminal judges whether registered-user information is received in response to the transmission demand transmitted in step S23A (step S24A). When registered-user information is received, the processing proceeds to step S27A. When registered-user information is not received, the processing proceeds to step S35. For example, when the user identification information "Suzan" is received in step S21, its home terminal MFP 100C does not transmit the associated registered-user information, and thus the processing in the CPU 101 of the MFP 100 proceeds to step S35. In step S35, the CPU 101 executes an error processing. The error processing includes displaying a message on the display portion 119B denoting that the user cannot log in.

In step S27A, the CPU 101 of the MFP 100 compares the function information of the registered-user information received in step S24A with the function information of the CPU's own apparatus. In the next step S28, the CPU 101 judges whether there are identical functions in the function information of the registered-user information received in step S24A and the function information of the CPU's own apparatus. When there are identical functions, the processing proceeds to step S29A. When there are no identical functions, the processing proceeds to step S35. In step S29A, the identical functions are set to execution-permitted functions, and the processing proceeds to step S30.

Steps S31 to S34 are the same as in FIG. 5 and therefore description thereof will not be repeated.

It is possible that in the initial setting processing (FIG. 9A), the steps S55 to S60 are not executed so that user data is not stored in the HDD 107 and only registered-user information is stored in the HDD 107. In this case, the CPU 101 of the MFP 100 cannot detect the home terminal of the user in step S23A shown in FIG. 12, and therefore the CPU 101 transmits by broadcast a transmission demand for registered-user information. In response, the MFP 100A, among the other MFPs 100A, 100B, and 100C, which is the home terminal of the user identification information "Julie", transmits the registered-user information of the MFP 100A.

FIG. 14A is a diagram showing an example of the function information of the user identification information "Julie". FIG. 14B is a diagram showing an example of the function information stored in the MFP 100. The function information shown in FIG. 14A is defined in the registered-user information of the user identification information "Julie", among sets of registered-user information stored in the MFP 100A, and defines functions permitted to the user identified by the user identification information "Julie". Referring to FIG. 14B, the function information stored in the MFP 100 defines the functions possessed by the MFP 100. In FIGS. 14A and 14B, the functions common among the functions possessed by the MFP 100A and the functions possessed by the MFP 100 are highlighted by hatching.

FIG. 15 is a second diagram showing an example of functions permitted to the user identified by the user identification information "Julie". FIG. 15 shows the functions that the user identified by the user identification information "Julie" is permitted to execute in the operated terminal MFP 100, which is not the user's home terminal (MFP 100A), when the user logs in the operated terminal MFP 100. The functions common among the functions defined in the function information of the user identification information "Julie" stored in the MFP 100A and shown in FIG. 14A and the functions defined in the function information stored in the operated terminal MFP 100 and shown in FIG. 14B are the functions that the user identification information "Julie" is permitted to execute in the operated terminal MFP 100.

As described hereinbefore, in the second embodiment, the MFPs 100, 10A, 100B, and 100C store in each HDD 107 registered-user information including at least user identification information and function information. Upon receipt of input of user identification information, an MFP among the MFPs 100, 100A, 100B, and 100C judges whether the MFP's HDD 107 stores registered-user information including the received user identification information. When the MFP judges that such registered-user information is stored, the MFP permits execution of the functions defined in the function information included in the registered-user information (step S37A). When the MFP judges that such registered-user information is not stored, the MFP acquires function information corresponding to the received user identification information from the home terminal, among the MFPs 100, 100A, 100B, and 100C, that stores the registered-user information including the user identification information (step S24A). The MFP then permits execution of the functions, among the functions defined in the received function information, that are also possessed by the MFP itself (step S29A). By storing user identification information in either one of a plurality of MFPs 100, 100A, 100B, and 100C that are connected to a network, the one MFP becomes the home terminal of the user identification information. When the user identified by the user identification information logs in some other MFP than the user's home terminal, the user can execute functions within the range of the functions permitted in the user's home terminal. Thus, by the simple operation of storing user identification information in either one of a plurality of MFPs 100, 100A, 100B, and 100C that are connected to a network, the user can execute in another MFP functions within the range of the functions permitted in the user's home terminal.

The registered-user information stored in the HDD 107 of each of the plurality of MFPs 100, 100A, 100B, and 100C includes user identification information and function information defining functions, among the functions possessed by the home terminal MFP, that the user identified by the user identification information is permitted to execute (FIGS. 10A to 10D). The MFP acquires function information corresponding to the received user identification information from the home terminal of the user identified by the user identification information, among the plurality of MFPs 100, 100A, 100B, and 100C (step S24). Thus, the user can execute, using another MFP, functions within the range of the functions that user is permitted to execute in the user's home terminal.

The registered-user information stored in the HDD 107 of each of the plurality of MFPs 100, 100A, 100B, and 100C further includes disclosability information denoting whether to disclose the registered-user information (FIGS. 10A to 10D). The home terminal transmits the function information of the user on condition that the disclosability information denotes the registered-user information as disclosable ("YES" in step S43A or in step S62). This enables the home terminal to set another MFP to be or not to be an operated terminal on a user basis.

Third Embodiment

Next, an image-processing system according to a third embodiment will be described. In the image-processing system according to the third embodiment, as in the second embodiment, each of the MFP 100, 100A, 100B, and 100C stores user data including the registered-user information stored in all the other MFPs. The user data stored in the MFP 100, 100A, 100B, and 100C in the third embodiment, however, as opposed to the user data in the second embodiment, associates at least user identification information with function information, in addition to the home terminal of apparatus identification information.

FIG. 16A is a third flow chart showing an example of the flow of the initial setting processing. The initial setting processing is executed in the MFP 100 when the MFP 100 is newly connected to the network 2. FIG. 16B is a second flow chart showing an example of the flow of the connection processing. The connection processing is executed in the other MFPs 100A, 100B, and 100C, which are already connected to the network 2, when the MFP 100 is newly connected to the network 2. The initial setting processing and the connection processing are executed by the CPU 101 of each of the MFPs 100, 100A, 100B, and 100C by executing a function execution authorizing program stored in each flash memory 108.

In the initial setting processing shown in FIGS. 9A and 16A, like steps are denoted with like numerals. In the connection processing shown in FIGS. 9B and 16B, like steps are denoted with line numerals. Description will be made mainly of different points in FIGS. 16A and 16B from the initial setting processing shown in FIG. 9A and the connection processing shown in FIG. 9B, respectively.

Referring to FIG. 16A, in step S55A, the MFP 100 transmits its terminal information and registered-user information that have been subjected to initial processing to a terminal of the same group. The MFP 100, however, does not transmit registered-user information whose disclosability information is set to "NG". While it is possible that such registered-user information is set to be transmitted, it is necessary in this case to include disclosability information in user data. The MFP 100 transmits its apparatus identification information and registered-user information to one terminal chosen from the MFPs 100A, 100B, and 100C, which are the same group as the MFP 100. The following description is about the case where the MFP 100A is chosen and the apparatus identification information and the user identification information of the MFP 100 are transmitted from the MFP 100 to the MFP 100A.

Referring to FIG. 16B, the MFP 100A judges whether the apparatus identification information and the user identification information transmitted from the MFP 100 are received (step S61A). When the apparatus identification information and the user identification information are received, the processing proceeds to step S62. Otherwise, the processing is discontinued. That is, the connection processing is executed on condition that a demand from the MFP 100 that has executed the initial setting processing is received. In step S62, the CPU 101 of the MFP 100A extracts registered-user information, among sets of registered-user information stored in the HDD 107 of the MFP 100A, in which the disclosability information is set to "OK" ("YES" in step S62). The CPU 101 of the MFP 100A then transmits to the MFP 100 the user identification information and the apparatus identification information included in the extracted registered-user information (step S63A). In the next step S63B, the CPU 101 of the MFP 100A compares the function information included in the received registered-user information with the function information stored in the HDD of the MFP 100A. The CPU 101 of the MFP 100A then changes the function information included in the received registered-user information to function information defining the functions that are common among both function information (step S63C). This is to limit the functions permitted for execution in another apparatus within the range of the functions that are permitted for execution in the MFP 100A. In the next step S64A, the CPU 101 of the MFP 100A generates user data from the apparatus identification information and the user identification information of the MFP 100 received in step S61A, and adds the generated user data to user data already stored in the HDD 107. The generated user data includes at least the user identification information and the function information.

Referring back to FIG. 16A, the MFP 100 receives the apparatus identification information and the user identification information of the MFP 100A transmitted from the MFP 100A (step S56A). Then, the MFP 100 judges whether there is an MFP in the same group that the MFP 100 has not transmitted its apparatus identification information and user identification information to (step S57). When such an MFP exists, the MFP is chosen and the processing goes back to step S55A. When such an MFP does not exist, the processing proceeds to step S58. While the MFP 100 chooses an MFP of the same group in a one-by-one manner and transmits the apparatus identification information and the user identification information of the MFP 100 to the chosen MFP, it is also possible that the MFP 100 transmits by broadcast its apparatus identification information and user identification information and receives the apparatus identification information and the user identification information stored in each of the MFPs 100A, 100B, and 100C from each of the MFPs 100A, 100B, and 100C.

When, after step S59 or in step S58, the MFP 100 judges that its own registered-user information is not used, then the MFP 100, in step S59A, compares the function information included in the received registered-user information with the function information stored in the HDD of the MFP 100 itself. The MFP 100 then changes the function information included in the received registered-user information to function information defining the functions that are common among both function information (step S59B). This is to limit the functions permitted for execution in another apparatus within the range of the functions that are permitted for execution in the MFP 100. In step S60A, the MFP 100 generates user data from the apparatus identification information and the user identification information. When step S59 is skipped, sets of user data are generated from the apparatus identification information and the user identification information received from the MFPs 100A, 100B, and 100C. When step S59 is executed, sets of user data are generated from pieces of user identification information received from the MFPs 100A, 100B, and 100C, the registered-user information stored in the MFP 100, and pieces of the apparatus identification information of the MFPs 100, 100A, 100B, and 100C. The user data includes apparatus identification information and registered-user information. The user data generated when the MFP 100 judges to use its own registered-user information in step S58 will be referred to as first user data. The user data generated when the MFP 100 judges not to use its own registered-user information in step S58 will be referred to as second user data. The generated user data is stored in the HDD 107 of the MFP 100.

FIG. 17 is a second diagram showing an example of the first user data. The first user data is generated in the MFPs 100, 100A, 100B, and 100C by executing the initial setting processing, shown in FIG. 16A, in the MFP 100 and the connection processing, shown in FIG. 16B, in the MFPs 100A, 100B, and 100C, and stored in the MFPs 100, 100A, 100B, and 100C. The first user data is generated when the sets of registered-user information shown in FIGS. 10A to 10D are stored respectively in the MFP 100, 100A, 100B, and 100C. The first user data is composed of four sets of user data including the pieces of user identification information of the users who respectively use the MFPs 100, 100A, 100B, and 100C as the users' home terminals. The user identification information "Suzan", which identifies the user who uses the MFP 100C as the user's home terminal, is not included. The user data includes all of each set of registered-user information except disclosability information. It should be noted, however, that the user data may include at least user identification information and function information.

Thus, when the MFP 100 executes the initial setting processing, the same first user data is generated and stored in the MFPs 100, 100A, 100B, and 100C, which are the same group. Thus, an image-processing system 1 composed of the MFPs 100, 100A, 100B, and 100C is formed. Formation of the image-processing system 1 enables it to identify, on the basis of the user data, a user who uses either one of the MFPs 100, 100A, 100B, and 100C as the user's home terminal. A user who uses either one of the MFPs 100, 100A, 100B, and 100C as the user's home terminal is permitted to log in an operated terminal, among the MFPs 100, 100A, 100B, and 100C, by inputting the user's user identification information into the operated terminal.

Figure 18:
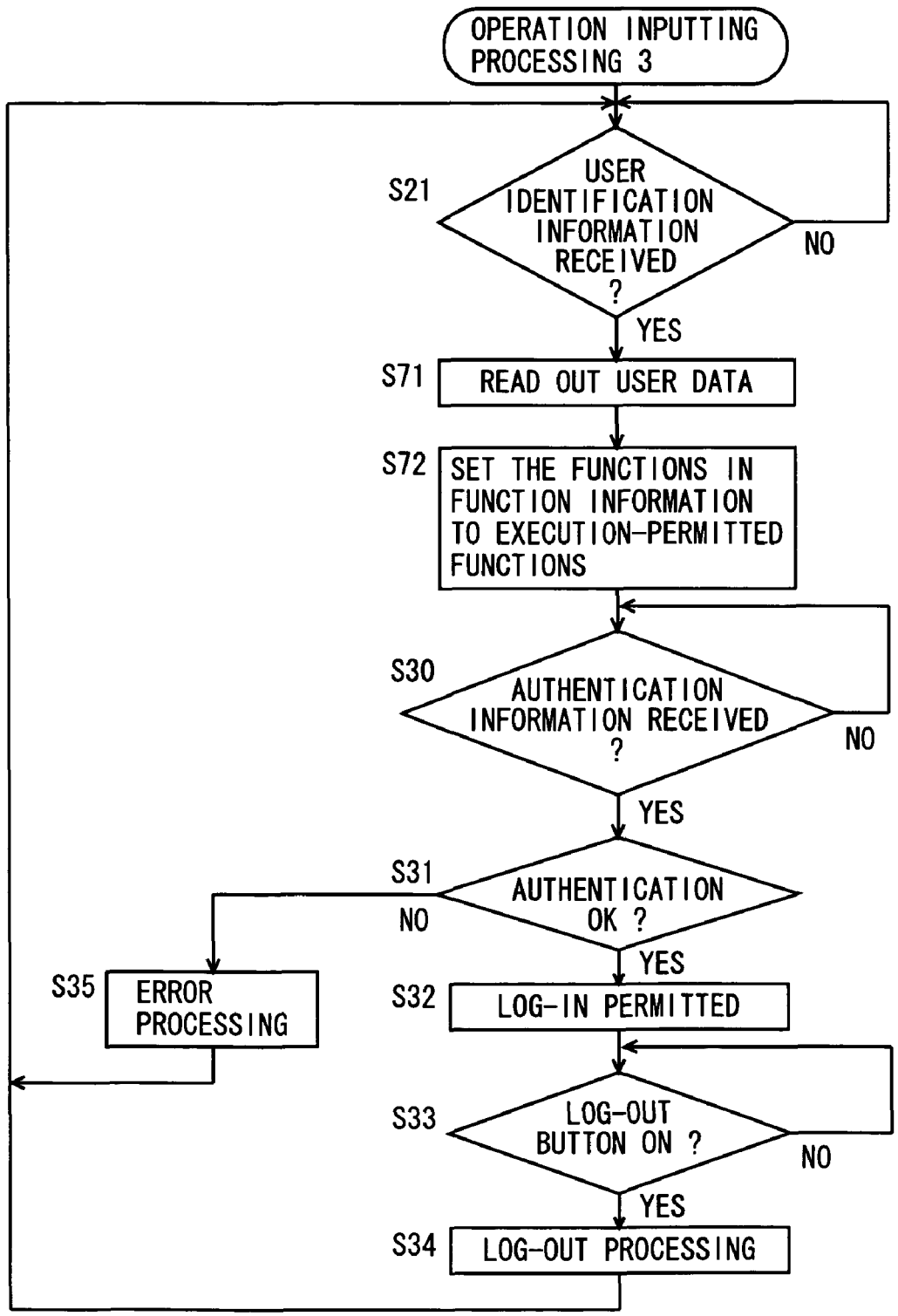
FIG. 18 is a third flow chart showing the flow of the operation inputting processing.

FIG. 18 is a third flow chart showing the flow of the operation inputting processing. The operation inputting processing is executed in an operated terminal, among the MFPs 100, 100A, 100B, and 100C, that a user intends to operate. The operation inputting processing is executed by the CPU 101 of each of the MFPs 100, 100A, 100B, and 100C by loading in each RAM 105 a function execution authorizing program stored in each flash memory 108 and executing the program. Here the example where the user identified by the user identification information "Julie" uses the MFP 100 as an operated terminal and inputs the user identification information into the MFP 100 will be described.

In the operation inputting processing shown in FIGS. 5 and 18, like steps are denoted with like numerals. Description will be made mainly of different points in FIG. 12 from the operation inputting processing shown in FIG. 5. Referring to FIG. 18, the CPU 101 of the MFP 100 judges whether input of user identification information is received (step S21). When the user identification information is received, the processing proceeds to step S71. Otherwise, the MFP 100 turns into a stand-by state. That is, the operated terminal executes steps S71 and thereafter on condition that user identification information is input.

In step S71, the MFP 100 searches the user data stored in the HDD 107 of the MFP 100 and reads out user data including the user identification information received in step S21. In step S72, the MFP 100 sets the functions defined in the function information of the user data read out in step S71 to execution-permitted functions, and the processing proceeds to step S30. Steps S30 to S35 are as shown in FIG. 5, and therefore description thereof will not be repeated.

As described hereinbefore, in the third embodiment, upon receipt of input of user identification information and function information, an MFP among the MFPs 100, 100A, 100B, and 100C generates user data including the corresponding registered-user information, and stores the generated user data in the HDD 107 (S60A). When storing new registered-user information in the HDD 107, the MFP transmits to all the other MFPs a registration demand including the user identification information and the function information (S55A). When the MFP receives a registration demand including user identification information and function information from either one of the other MFPs, among the MFPs 100, 100A, 100B, and 100C (S56A), then the MPF, in response, generates new user data including the received user identification information and new function information defining the functions, among the functions defined in the received function information, that are also possessed by the MFP itself (S59A, S59B, S60A, S64A). Upon receipt of input of user identification information (step S21), the MFP permits, on condition that user data including the input user identification information is stored in the HDD 107, execution of the functions defined in the function information included in the user data (S72). Thus, by storing user identification information and function information in either one of MFPs 100, 100A, 100B, and 100C that are connected to a network and communicable with one another, it becomes possible to, in an image-processing apparatus not storing the user identification information, set functions possessed by the apparatus that are executable within the range of the functions possessed by the image-processing apparatus storing the user identification information.

The MFP further receives input of disclosability information denoting whether to disclose the input registered-user information (S52A), and generates new registered-user information including the received disclosability information (S53A). On condition that the disclosability information denotes the new registered-user information as disclosable (S62A), the MFP transmits to all the other image-processing apparatuses a registration demand including the new registered-user information.

While in the above-described embodiments description has been made of the MFPs 100, 100A, 100B, and 100C as image-processing apparatuses, it will be readily appreciated that the present invention can be taken as a function execution authorizing method or a function execution authorizing program for causing the MFPs 100, 100A, 100B, and 100C to execute the steps shown in FIGS. 3, 5, and 6, or FIGS. 9A, 9B, 12, and 13, or FIGS. 16A, 16B, and 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image-processing system including a plurality of communicably connected image-processing apparatuses, each of said plurality of image-processing apparatuses comprising:
   a storing portion to store registered-user information including at least user identification information for identifying a user;
   a user-identification-information receiving portion to receive input of said user identification information;
   a judging portion to judge whether said registered-user information including said received user identification information is stored in said storing portion;
   a first permitting portion to, when said judging portion judges that said registered-user information is stored in said storing portion, permit execution of at least one function possessed by said first permitting portion's own image-processing apparatus;
   a function information acquiring portion to, when said judging portion judges that said registered-user information is not stored in said storing portion, acquire function information defining at least one function possessed by another image-processing apparatus among said plurality of image-processing apparatuses without having to pre-identify the source of said function information, said another image-processing apparatus storing said registered-user information including said received user identification information; and a second permitting portion to permit execution of a function among the functions defined in said function information, the function being also possessed by said second permitting portion's own image-processing apparatus.

2. The image-processing system according to claim 1, wherein:
   said registered-user information stored in said storing portion of each of said plurality of image-processing apparatuses includes user identification information and function information defining a function, among functions possessed by each image-processing apparatus, to give permission for execution to said user identification information; and
   said function information acquiring portion acquires function information corresponding to said received user identification information from either one of said plurality of image-processing apparatuses.

3. The image-processing system according to claim 1, wherein:
   said registered-user information stored in said storing portion of each of said plurality of image-processing apparatuses includes disclosability information denoting whether to disclose said registered-user information; and
   each of said plurality of image-processing apparatuses further comprises a function information transmitting portion to transmit said function information on condition that said disclosability information denotes disclosure of said registered-user information.

4. The image-processing system according to claim 1, wherein each of said plurality of image-processing apparatuses further comprises:
   a user-identification-information transmission demanding portion to demand at least one of the other image-processing apparatuses among said plurality of image-processing apparatuses to transmit user identification information stored in said storing portion of said one image-processing apparatus;
   a user-identification-information receiving portion to receive said user identification information transmitted from said one image-processing apparatus in response to the user-identification-information transmission demand by said user-identification-information transmission demanding portion; and
   a user data storing portion to store user data associating said user identification information received by said user-identification-information receiving portion with apparatus identification information of said one image-processing apparatus storing said user identification information,
   wherein said function information acquiring portion includes a transmission demanding portion to demand said one image-processing apparatus to transmit said function information, said one image-processing apparatus being identified by said apparatus identification information associated by said user data with said received user identification information.

5. An image-processing system including a plurality of communicably connected image-processing apparatuses, each of the plurality of image-processing apparatuses comprising:
   a storing portion to store registered-user information including: user identification information for identifying a user; and function information defining a function, among functions possessed by each image-processing apparatus, to give permission for execution to said user identification information;
   a first registered-user information generating portion to receive input of said user identification information and said function information and to generate new registered-user information including said received user identification information and said received function information;
   a registering portion to store said registered-user information in said storing portion;
   a user-identification-information receiving portion to receive input of said user identification information; and
   a permitting portion to permit execution of a function defined in said function information corresponding to said received user identification information, on condition that said registered-user information including said user identification information received by said user-identification-information receiving portion is stored in said storing portion,
   wherein said registering portion includes:
   a register-demand transmitting portion to, when storing said new registered-user information in said storing portion, transmit a register demand to all the other image-processing apparatuses, the register demand including said user identification information and said function information; and
   a second registered-user-information generating portion to generate, upon reception of said register demand including said user identification information and said function information from either one of said plurality of image-processing apparatuses, new registered-user information including said received user identification information and new function information defining, among functions defined in said received function information, a function possessed by said second registered-user-information generating portion's own image-processing apparatus.

6. The image-processing system according to claim 5, wherein:
   said first registered-user-information generating portion further receives disclosability information denoting whether to disclose said registered-user information and includes said received disclosability information in said new registered-user information; and
   said register-demand transmitting portion transmits said register demand to all the other image-processing apparatuses on condition that said received disclosability information denotes disclosure of said registered-user information.

7. An image-processing apparatus mutually communicable with another image-processing apparatus, said image-processing apparatus comprising:
   a storing portion to store registered-user information including at least user identification information for identifying a user;
   a user-identification-information receiving portion to receive input of said user identification information;
   a judging portion to judge whether said registered-user information including said received user identification information is stored in said storing portion;
   a first permitting portion to, when said judging portion judges that said registered-user information is stored in said storing portion, permit execution of at least one function possessed by said first permitting portion's own image-processing apparatus;
   a function information acquiring portion to, when said judging portion judges that said registered-user information is not stored in said storing portion, acquire function information defining at least one function possessed by another image-processing apparatus storing said registered-user information including said received user identification information; and a second permitting portion to permit execution of a function among the functions defined in said function information, the function being also possessed by said second permitting portion's own image-processing apparatus.

8. The image-processing apparatus according to claim 7, wherein said function information acquiring portion acquires, from said another image-processing apparatus, function information defining a function to give permission for execution to said received user identification information.

9. The image-processing apparatus according to claim 7, wherein said second permitting portion does not permit execution of a function possessed by said second permitting portion's own image-processing apparatus when said function information acquiring portion cannot acquire said function information.

10. The image-processing apparatus according to claim 7, further comprising:
a user-identification-information transmission demanding portion to demand said another image-processing apparatus to transmit user identification information stored said another image-processing apparatus;
a user-identification-information receiving portion to receive said user identification information transmitted from said another image-processing apparatus in response to the user-identification-information transmission demand by said user-identification-information transmission demanding portion; and
a user data storing portion to store user data associating said user identification information received by said user-identification-information receiving portion with apparatus identification information of said another image-processing apparatus storing said user identification information,
wherein said function information acquiring portion includes a transmission demanding portion to demand said another image-processing apparatus to transmit said function information, said another image-processing apparatus being identified by said apparatus identification information associated by said user data with said received user identification information.

11. An image-processing apparatus mutually communicable with another image-processing apparatus, said image-processing apparatus comprising:
a storing portion to store registered-user information including: user identification information for identifying a user; and function information defining a function, among functions possessed by said storing portion's own image-processing apparatus, to give permission for execution to said user identification information;
a first registered-user information generating portion to receive input of said user identification information and said function information and to generate new registered-user information including said received user identification information and said received function information;
a registering portion to store said generated registered-user information in said storing portion;
a user-identification-information receiving portion to receive input of said user identification information; and
a permitting portion to permit execution of a function defined in said function information corresponding to said received user identification information, on condition that said registered-user information including said user identification information received by said user-identification-information receiving portion is stored in said storing portion,
wherein said registering portion includes:
a register-demand transmitting portion to, when storing said new registered-user information in said storing portion, transmit a register demand to said another image-processing apparatus, the register demand including said user identification information and said function information; and
a second registered-user information generating portion to generate, upon reception of said register demand including said user identification information and said function information from said another image-processing apparatus, new registered-user information including said received user identification information and new function information defining, among functions defined in said received function information, a function possessed by said second registered-user-information generating portion's own image-processing apparatus.

12. The image-processing apparatus according to claim 11, wherein:
said first registered-user-information generating portion further receives disclosability information denoting whether to disclose said registered-user information and includes said received disclosability information in said new registered-user information; and
said register-demand transmitting portion transmits said register demand to said another image-processing apparatus on condition that said received disclosability information denotes disclosure of said registered-user information.

13. A function execution authorizing method executed in an image-processing apparatus mutually communicable with another image-processing apparatus, wherein:
said image-processing apparatus includes a storing portion to store registered-user information including at least user identification information for identifying a user; and
said method comprises:
a step of receiving input of said user identification information;
a step of judging whether said registered-user information including said received user identification information is stored in said storing portion;
a first permitting step of permitting, when said registered-user information is judged to be stored in said storing portion, execution of at least one function possessed by said image-processing apparatus;
a step of acquiring, when said registered-user information is judged not to be stored in said storing portion, function information defining at least one function possessed by another image-processing apparatus storing said registered-user information including said received user identification information; and
a second permitting step of permitting execution of a function among the functions defined in said acquired function information, the function being also possessed by said image-processing apparatus.

14. The function execution authorizing method according to claim 13, wherein said step of acquiring said function information includes a step of acquiring, from said another image-processing apparatus, function information defining a function to give permission for execution to said received user identification information.

15. The function execution authorizing method according to claim 13, wherein said second permitting step includes a step of, when said function information cannot be acquired in said step of acquiring said function information, not permitting execution of said functions possessed by said image-processing apparatus.

16. A function execution authorizing method executed in an image-processing apparatus mutually communicable with another image-processing apparatus, wherein:
    said image-processing apparatus includes a storing portion to store registered-user information including: user identification information for identifying a user; and function information defining a function, among functions possessed by said image-processing apparatus, to give permission for execution to said user identification information; and
    said method comprises:
    a first generating step of receiving input of said user identification information and said function information and generating new registered-user information including said received user identification information and said received function information;
    a step of storing said generated registered-user information in said storing portion;
    a step of receiving input of said user identification information; and
    a step of permitting execution of a function defined in said function information corresponding to said received user identification information, on condition that said registered-user information including said received user identification information is stored in said storing portion,
    wherein said step of storing said generated registered-user information in said storing portion includes:
    a step of transmitting, when storing said new registered-user information in said storing portion, a register demand to said another image-processing apparatus, the register demand including said user identification information and said function information; and
    a second generating step of generating, upon reception of said register demand including said user identification information and said function information from said another image-processing apparatus, new registered-user information including said received user identification information and new function information defining, among functions defined in said received function information, a function possessed by said image-processing apparatus.

17. The function execution authorizing method according to claim 16, wherein:
    said first generating step includes a step of further receiving disclosability information denoting whether to disclose said registered-user information and including said received disclosability information in said new registered-user information; and
    said step of transmitting said register demand includes a step of transmitting said register demand to said another image-processing apparatus on condition that said received disclosability information denotes disclosure of said registered-user information.

18. A function execution authorizing program embodied in a computer readable medium, said program being executed in an image-processing apparatus mutually communicable with another image-processing apparatus, wherein:
    said image-processing apparatus includes a storing portion to store registered-user information including at least user identification information for identifying a user; and
    said program comprises:
    a step of receiving input of said user identification information;
    a step of judging whether said registered-user information including said received user identification information is stored in said storing portion;
    a first permitting step of permitting, when said registered-user information is judged to be stored in said storing portion, execution of at least one function possessed by said image-processing apparatus;
    a step of acquiring, when said registered-user information is judged not to be stored in said storing portion, function information defining at least one function possessed by another image-processing apparatus storing said registered-user information including said received user identification information; and
    a second permitting step of permitting execution of a function among the functions defined in said acquired function information, the function being also possessed by said image-processing apparatus.

19. A function execution authorizing program embodied in a Non Transitory computer readable medium, said program being executed in an image-processing apparatus mutually communicable with another image-processing apparatus, wherein: said image-processing apparatus includes a storing portion to store registered-user information including: user identification information for identifying a user; and function information defining a function, among functions possessed by said image-processing apparatus, to give permission for execution to said user identification information; and said program comprises: a first generating step of receiving input of said user identification information and said function information and generating new registered-user information including said received user identification information and said received function information; a step of storing said generated registered-user information in said storing portion; a step of receiving input of said user identification information; and a step of permitting execution of a function defined in said function information corresponding to said received user identification information, on condition that said registered-user information including said received user identification information is stored in said storing portion, wherein said step of storing said generated registered-user information in said storing portion includes: a step of transmitting, when storing said new registered-user information in said storing portion, a register demand to said another image-processing apparatus, the register demand including said user identification information and said function information; and a second generating step of generating, upon reception of said register demand including said user identification information and said function information from said another image-processing apparatus, new registered-user information including said received user identification information and new function information defining, among functions defined in said received function information, a function possessed by said image-processing apparatus.

* * * * *